United States Patent
Shikayama et al.

(10) Patent No.: US 7,936,096 B2
(45) Date of Patent: May 3, 2011

(54) CANNED LINEAR MOTOR ARMATURE AND CANNED LINEAR MOTOR

(75) Inventors: Toru Shikayama, Kitakyushu (JP); Muhammad Enamul Kabir, Kitakyushu (JP); Akihito Toyota, Kitakyushu (JP); Kenichi Sadakane, Kitakyushu (JP); Shusaku Yoshida, Kitakyushu (JP); Mitsuhiro Matsuzaki, Kitakyushu (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 0 days.

(21) Appl. No.: 12/549,361

(22) Filed: Aug. 28, 2009

(65) Prior Publication Data

US 2009/0315414 A1    Dec. 24, 2009

Related U.S. Application Data

(63) Continuation of application No. PCT/JP2008/058905, filed on May 15, 2008.

(30) Foreign Application Priority Data

Jun. 13, 2007 (JP) .................................. 2007-156104
Sep. 20, 2007 (JP) .................................. 2007-243501
Apr. 17, 2008 (JP) .................................. 2008-108297

(51) Int. Cl.
*H02K 41/02* (2006.01)
(52) U.S. Cl. .................................................. 310/12.29
(58) Field of Classification Search ............... 310/12.29
See application file for complete search history.

(56) References Cited

U.S. PATENT DOCUMENTS

| | | | | |
|---|---|---|---|---|
| 6,825,583 | B2 * | 11/2004 | Joung et al. | 310/16 |
| 7,635,929 | B2 * | 12/2009 | Shikayama et al. | 310/12.22 |
| 7,663,270 | B2 * | 2/2010 | Sadakane et al. | 310/12.29 |
| 2001/0013580 | A1 | 8/2001 | Buis et al. | |
| 2002/0163256 | A1 * | 11/2002 | Tajima | 310/12 |
| 2003/0141769 | A1 * | 7/2003 | Kubo | 310/12 |
| 2004/0218167 | A1 | 11/2004 | Johan Hol et al. | |
| 2006/0220478 | A1 * | 10/2006 | Emoto | 310/58 |

FOREIGN PATENT DOCUMENTS

| | | |
|---|---|---|
| EP | 1758231 * | 2/2007 |
| JP | 06-041381 | 5/1994 |
| JP | 06-254734 | 9/1994 |
| JP | 2001-025227 | 1/2001 |
| JP | 2001-238428 | 8/2001 |
| JP | 2001-284247 | 10/2001 |
| JP | 2002-027730 | 1/2002 |
| JP | 2004-048919 | 2/2004 |
| JP | 2004-312877 | 11/2004 |
| JP | 2004-343067 | 12/2004 |
| JP | 2005-020671 | 1/2005 |

* cited by examiner

*Primary Examiner* — Burton Mullins
(74) *Attorney, Agent, or Firm* — Ditthavong Mori & Steiner, P.C.

(57) ABSTRACT

A canned linear motor armature includes an armature winding, a picture-frame-shaped casing, a flat can, and a plurality of refrigerant flow channels. The armature winding includes a coil. The picture-frame-shaped casing has an opening and encloses the armature winding. The flat can has a plate surface to close and seal the opening of the picture-frame-shaped casing. The plurality of refrigerant flow channels are provided within the can to face the coil of the armature winding.

22 Claims, 16 Drawing Sheets

CANNED LINEAR MOTOR ARMATURE AND CANNED LINEAR MOTOR

CROSS-REFERENCE TO RELATED APPLICATIONS

The present application is a continuation application of PCT/JP2008/058905, filed May 15, 2008, which claims priority to Japanese Patent Application No. 2007-156104, filed Jun. 13, 2007, Japanese Patent Application No. 2007-243501, filed Sep. 20, 2007, and Japanese Patent Application No. 2008-108297, filed Apr. 17, 2008. The contents of these applications are incorporated herein by reference in their entirety.

BACKGROUND OF THE INVENTION

1. Field of the Invention

The present invention relates to a canned linear motor armature and a canned linear motor.

2. Discussion of the Background

A canned linear motor armature and a canned linear motor typically cover a can with an armature winding, and cause refrigerant to flow through a refrigerant flow channel provided between an armature winding and a can, thereby recovering heat generated by the armature winding using the refrigerant and reducing a rise in temperature at a surface of the linear motor (see, for example, Japanese Unexamined Utility Model Publication No. 06-41381 (pages 5-6, FIG. 1), Japanese Unexamined Patent Publication Nos. 2001-238428 (pages 5-6, FIG. 2), 2002-27730 (pages 3-5, FIG. 1), 2004-312877 (pages 4-5, FIG. 1), 2005-20671 (pages 4-6, FIG. 4), and 2001-284247 (pages 5-9, FIG. 2)). The contents of these publications are incorporated herein by reference in their entirety.

SUMMARY OF THE INVENTION

According to one aspect of the present invention, a canned linear motor armature includes an armature winding, a picture-frame-shaped casing, a flat can, and a plurality of refrigerant flow channels. The armature winding includes a coil. The picture-frame-shaped casing has an opening and encloses the armature winding. The flat can has a plate surface to close and seal the opening of the picture-frame-shaped casing. The plurality of refrigerant flow channels are provided within the can to face the coil of the armature winding.

According to another aspect of the present invention, a canned linear motor armature includes an armature winding, a picture-frame-shaped casing, a flat can, a plurality of refrigerant flow channels, and a supporting member. The armature winding includes a concentrated winding coil. The picture-frame-shaped casing has an opening and encloses the armature winding. The flat can is connected to the picture-frame-shaped casing and has a plate surface to close and seal the opening of the picture-frame-shaped casing. The armature winding is connected to the can. The plurality of refrigerant flow channels are provided within the can to face the coil of the armature winding. The supporting member is provided within the can to face an air-core of the concentrated winding coil. A gap is provided between the armature winding and the picture-frame-shaped casing.

According to further aspect of the present invention, a canned linear motor includes a canned linear motor armature and a field magnet. The canned linear motor armature includes an armature winding, a picture-frame-shaped casing, a flat can, and a plurality of refrigerant flow channels. The armature winding includes a coil. The picture-frame-shaped casing has an opening and encloses the armature winding. The flat can has a plate surface to close and seal the opening of the picture-frame-shaped casing. The plurality of refrigerant flow channels are provided within the can to face the coil of the armature winding. The field magnet is provided to face the canned linear motor armature with a magnetic gap therebetween. The field magnet has a plurality of permanent magnets whose polarities are alternately arranged. The field magnet and the canned linear motor armature are relatively movable.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1A is a perspective view of an entirety of the canned linear motor, and FIG. 1B is an elevational cross-sectional view taken along line B-B viewed from X direction in FIG. 1A;

FIG. 14A is a perspective view of an entirety of the canned linear motor, and FIG. 14B is an elevational cross-sectional view taken along line B-B viewed from X direction in FIG. 14A;

FIG. 24A is a side cross-sectional view of the can connecting portion, and FIG. 24B is a plan view of FIG. 24A;

FIG. 28A is a side cross-sectional view of the can connecting portion, and FIG. 28B is a plan view of FIG. 28A;

FIG. 30A is a side cross-sectional view of the can connecting portion, and FIG. 30B is a plan view of FIG. 30A;

FIG. 32A is a side cross-sectional view of the can connecting portion, and FIG. 32B is a plan view of FIG. 32A.

DESCRIPTION OF THE EMBODIMENTS

Figure 1A:
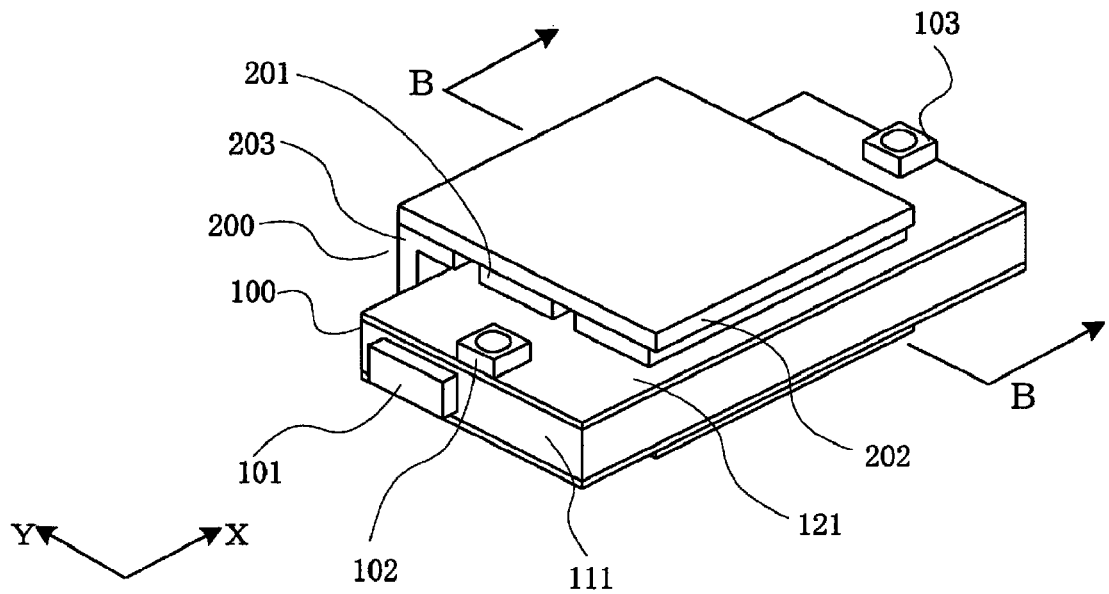
FIGS. 1A and 1B illustrate a canned linear motor common to first to fifth embodiments of the present invention.

Embodiments will now be described with reference to the accompanying drawings, wherein like reference numerals designate corresponding or identical elements throughout the various drawings.

An embodiment of the present invention is contrived to improve insulation reliability of a water-cooling canned linear motor armature, as well as to reduce a rise in temperature of both a surface of a linear motor and an armature winding, and further to provide a canned linear motor armature and a canned linear motor capable of preventing the can from being expanded even when a refrigerant pressure increases, reducing weight of the armature, and reducing a viscous braking force.

First Embodiment

Figure 1B:
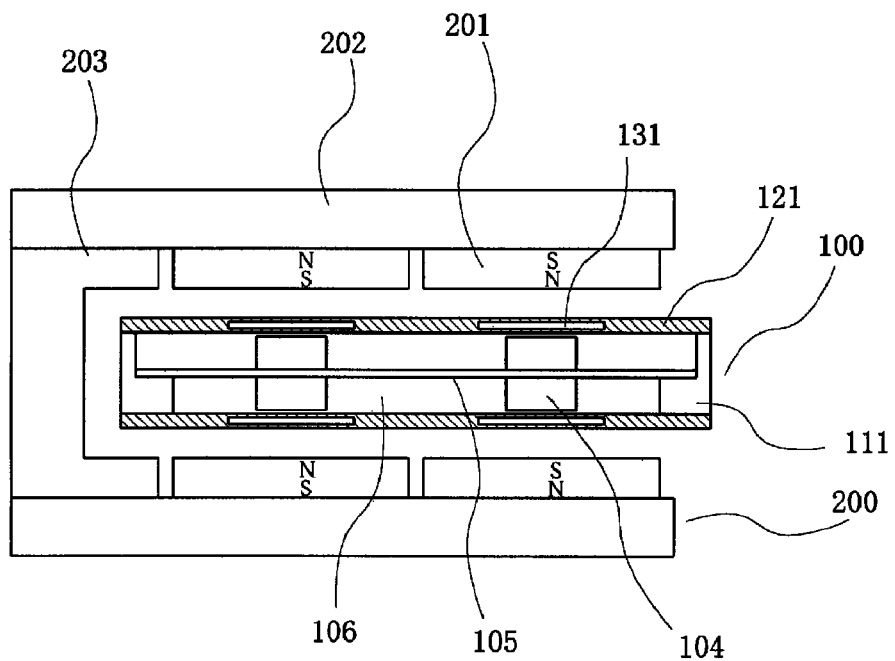
Figure 2:
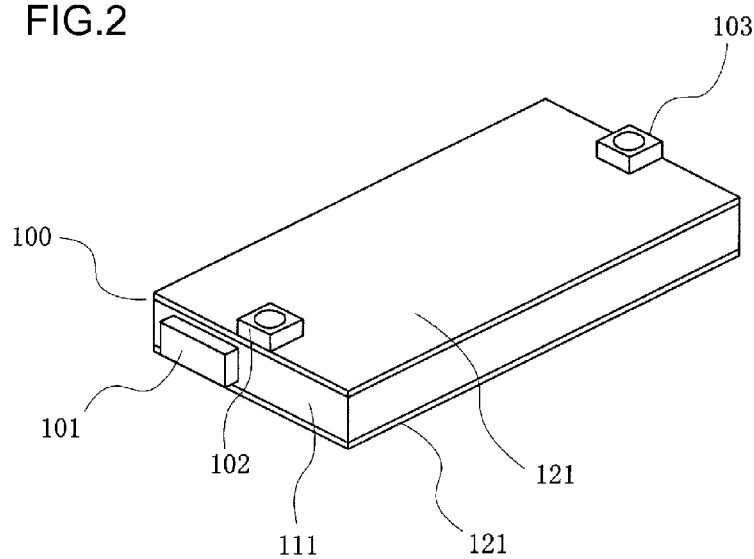
FIG. 2 is a perspective view illustrating a canned linear motor armature of the first embodiment according to the present invention.
Figure 3:
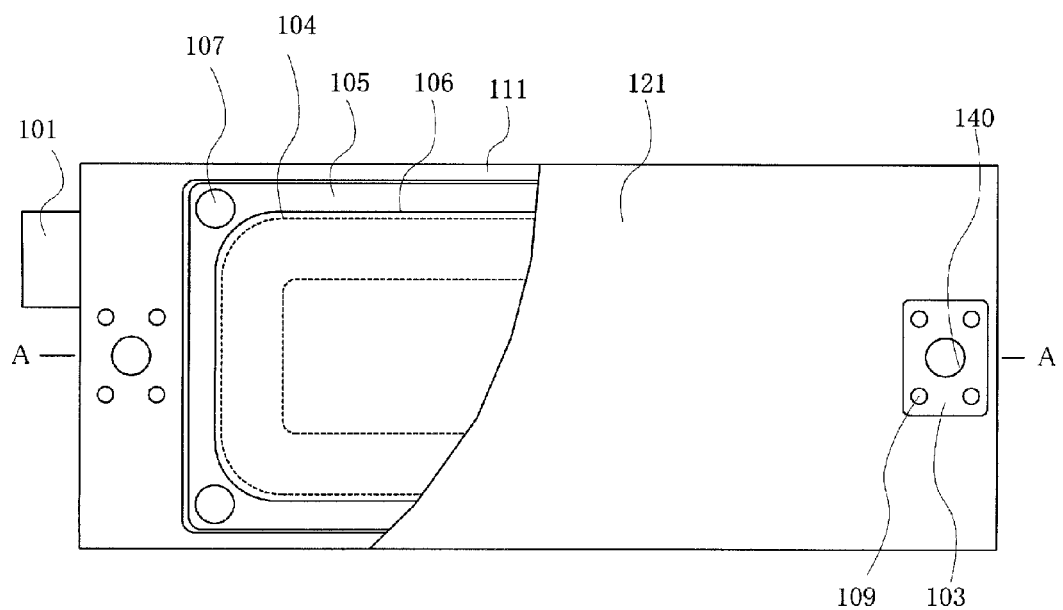
FIG. 3 is a plan view illustrating the armature viewed from an upper surface shown in FIG. 2, in which the can is partially cut out to illustrate positional relation between an armature winding and a substrate within the armature.
Figure 4:
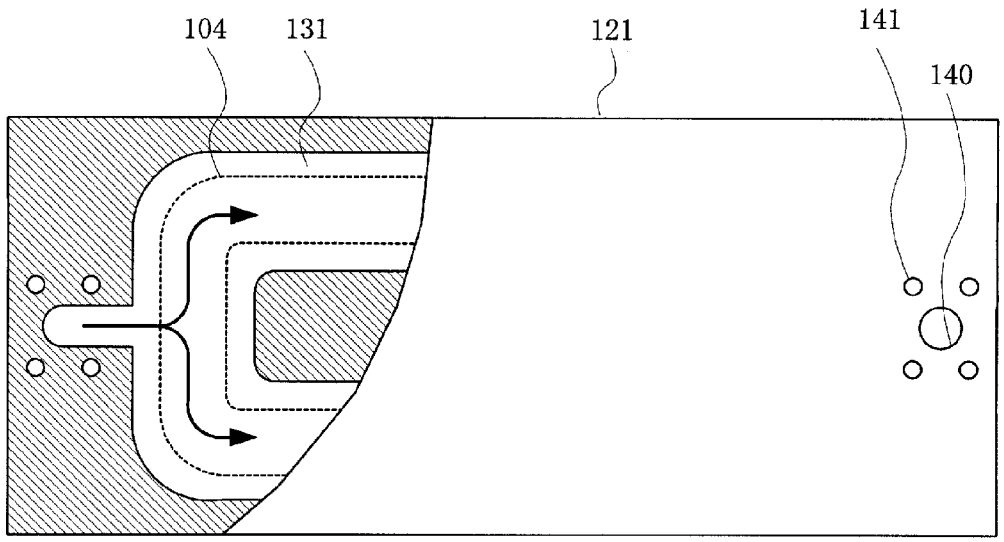
FIG. 4 is a plan view illustrating the armature viewed from the upper surface shown in FIG. 2, in which the can is partially cut out to illustrate positional relation between the armature winding and a refrigerant flow channel within the armature.
Figure 5:
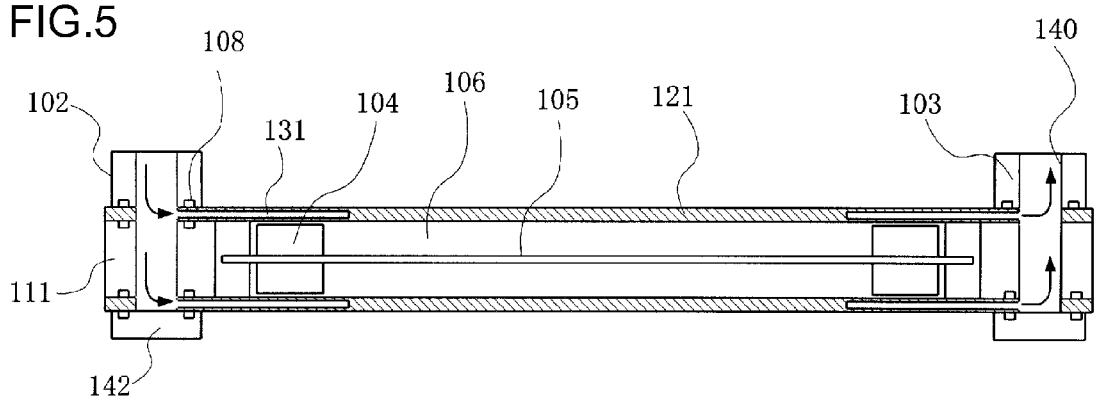
FIG. 5 is a side cross-sectional view of the armature taken along line A-A in FIG. 3.

FIGS. 1A and 1B illustrate a canned linear motor common to first to fifth embodiments of the present invention, and FIG. 1A is a perspective view of an entirety of the canned linear motor, and FIG. 1B is an elevational cross-sectional view taken along line B-B viewed from X direction in FIG. 1A. Further, FIG. 2 is a perspective view illustrating a canned linear motor armature of the first embodiment according to the present invention, FIG. 3 is a plan view illustrating the armature viewed from an upper surface shown in FIG. 2, in which the can is partially cut out to illustrate positional relation between an armature winding and a substrate within the armature, FIG. 4 is a plan view illustrating the armature viewed from the upper surface shown in FIG. 2, in which the can is partially cut out to illustrate positional relation between the armature winding and a refrigerant flow channel within the armature, and FIG. 5 is a side cross-sectional view of the armature taken along line A-A in FIG. 3. It should be noted that like components of the embodiment of the present invention as in the conventional art are represented by the like reference symbols and not explained in detail, and the following description focuses on differences between the present invention and the conventional art. Here, a configuration of a field 200 shown in FIG. 1B is the same as that of the conventional art.

The embodiment of the present invention is different from the conventional art in that a plurality of refrigerant flow channels 131 are provided within a can 121 of a canned linear motor armature shown in FIG. 1B, which is clearly distinguished from the configuration of the conventional art in which refrigerant flow channels are provided between the can and the armature winding. As shown in FIGS. 1B and 3, an armature 100 is configured such that armature windings 104 are provided on both sides of a substrate 105 within a picture-frame-shaped casing 111, and are formed into a single piece by a molding resin 106 around the substrate 105 and the armature winding 104, and fixed to the casing 111 by a substrate-fixing bolt 107 shown in FIG. 3. While the casing 111 is made of stainless steel as in the conventional art, the casing 111 may be made of CFRP or ceramic that is light weighted and has high strength.

Further, referring to FIGS. 1B, 2, and 3, both openings of the casing 111 are covered by the can 121 from both sides. At this time, no gap is provided the upper surface of the molding resin 106 and the can 121 in FIG. 1B. Further, referring to FIG. 4, the can 121 is provided with a channel port 140 through which the refrigerant comes in and out, as well as a through hole 141 for letting an O-ring fixing bolt 109 shown in FIG. 3 be inserted. The casing 111 is also provided with piping for supplying or discharging the refrigerant, and the channel port 140 of the can 121 is fastened at an end of the piping. Then, referring to FIG. 5, a refrigerant supply port 102 and a refrigerant discharge port 103 are provided on the channel port 140, and fastened by the O-ring fixing bolt 109 shown in FIG. 3 so that no leakage can occur through the O-ring 108 between the refrigerant supply port 102 or the refrigerant discharge port 103 and the can 121 and the casing 111. Further, a surface that is away from a surface on which the refrigerant supply port 102 and the refrigerant discharge port 103 are attached is sealed by a cap 142.

On the other hand, the refrigerant flow channels 131 as shown in FIG. 4 are formed within the can 121. It should be noted that, in FIG. 4, the armature winding 104 is shown by dotted line so that positional relation between the refrigerant flow channels 131 and a coil side of the armature winding 104 can be easily seen. The can 121 is configured such that, as shown in FIGS. 1B and 5, a pair of thin plated members each having a recess portion formed on a surface are integrated by diffusion bonding so that the recess portions face each other, and a space provided by the recess portions facing each other constitutes the refrigerant flow channel 131. The can 121 is made of stainless steel, copper or the like with which the can 121 can be manufactured by diffusion bonding. Further, as shown in FIG. 4, the refrigerant flow channel 131 is formed into a torus-shape so as to be positioned on a coil side upper surface of the armature winding 104. When the refrigerant is supplied from the refrigerant supply port 102, as shown by arrows in FIGS. 4 and 5, the refrigerant flows through the refrigerant flow channels 131 within the can 121, and is discharged from the refrigerant discharge port 103. During this time, the refrigerant recovers heat from the armature winding 104 generated due to copper loss. Further, as the refrigerant, water (including pure water and ultrapure water) having a high thermal conductivity, a high specific heat, and an extremely high heat recovery capability is used.

With the above configuration, the refrigerant is not brought into direct contact with the armature winding and the molding resin covering the armature winding, and accordingly, even when water is used as the refrigerant, reduction of insulation resistance of the armature winding or insulation breakdown does not occur. Further, it is possible to efficiently recover the heat generated by the armature winding with the refrigerant, and the rise in the temperature of the armature winding can be greatly reduced. Further, by the refrigerant recovering the heat, the heat is conducted from the refrigerant to the can, and to an entire can. As the heat is diffused in the can as a whole and dissipated, the rise in the surface temperature of the can can also be reduced. Moreover, the refrigerant flow channels within the can are made small in comparison with the conventional example, and accordingly it is possible to suppress an outward expansion of the can due to the pressure of the refrigerant.

Second Embodiment

Next, a second embodiment according to the present invention is described.

Figure 6:
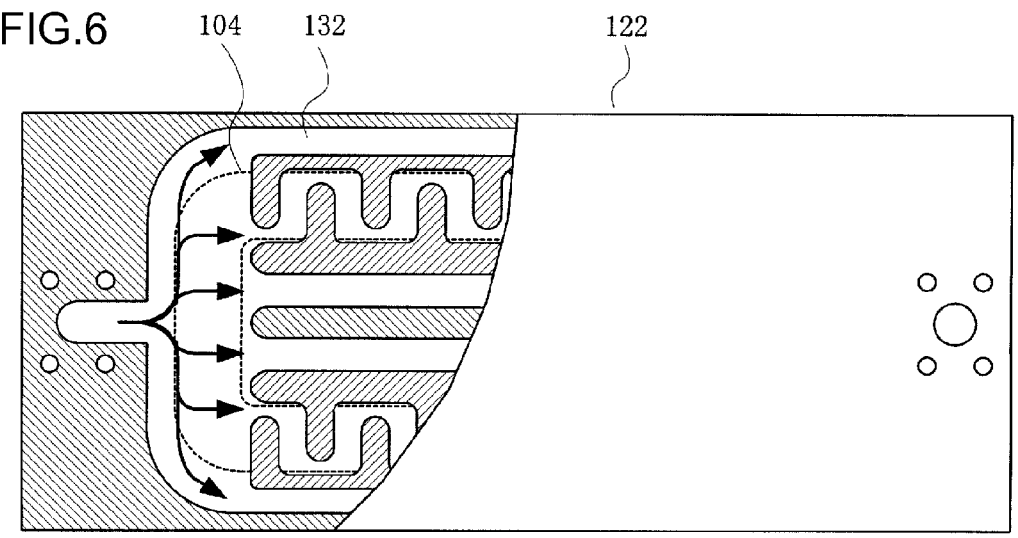
FIG. 6 is a plan view illustrating the armature of the second embodiment according to the present invention viewed from the upper surface of the can, in which the can is partially cut out to illustrate positional relation between the armature winding and a refrigerant flow channel within the armature.

FIG. 6 is a plan view illustrating the armature of the second embodiment viewed from the upper surface of the can, in which the can is partially cut out to illustrate positional relation between the armature winding and a refrigerant flow channel within the armature. The second embodiment is different from the first embodiment in that refrigerant flow channels 132 provided for a can 122 are formed in a serpentine shape at a coil side upper surface of the armature winding 104.

With the above configuration, by forming the refrigerant flow channels in a serpentine shape, a heat transfer coefficient increases along with an increase in a flow rate of the refrigerant, and further, a heat transfer area to the can becomes large at the coil side upper surface of the armature winding. Thus, the rise in the temperature of the armature winding can be further reduced in comparison with the first embodiment.

Third Embodiment

Next, a third embodiment according to the present invention is described.

Figure 7:
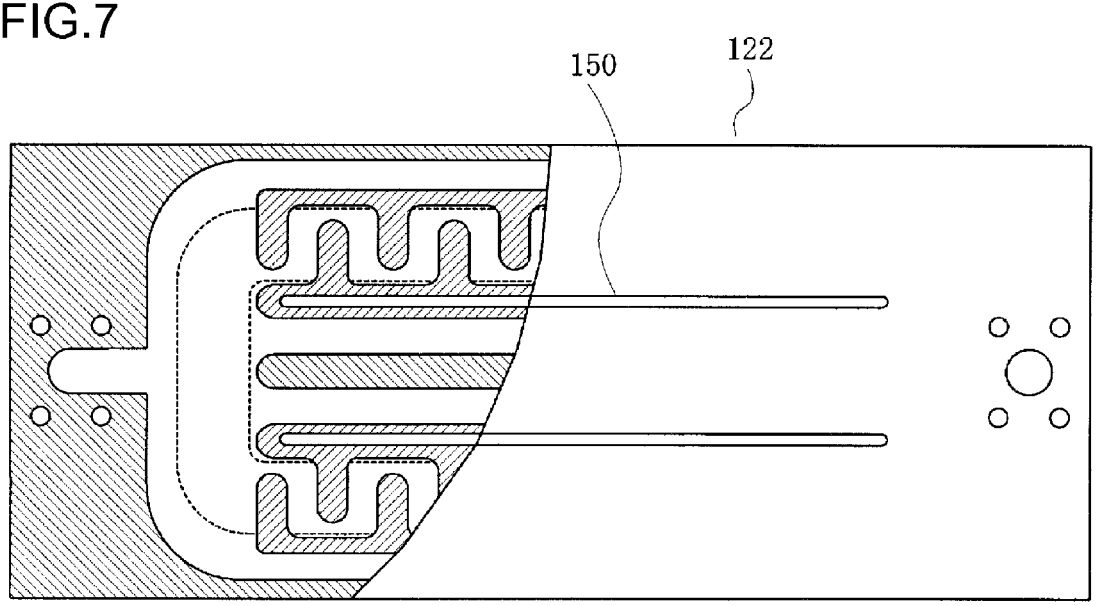
FIG. 7 is a plan view illustrating the armature of the third embodiment according to the present invention viewed from the upper surface of the can, in which the can is partially cut out to illustrate positional relation between the armature winding and a refrigerant flow channel within the armature.

FIG. 7 is a plan view illustrating the armature of the third embodiment viewed from the upper surface of the can, in which the can is partially cut out to illustrate positional relation between the armature winding and a refrigerant flow channel within the armature. The third embodiment is different from the second embodiment in that the can 122 is provided with a long hole 150 at a thick portion.

With the above configuration, an eddy current can be segmentalized. Accordingly, it is possible to reduce the viscous braking force in comparison with the conventional art, the first embodiment, and the second embodiment. Further, as the long hole is provided so as not to be brought into contact with the refrigerant flow channel, no leakage of the refrigerant through the long hole occurs at all.

Fourth Embodiment

Next, a fourth embodiment according to the present invention is described.

Figure 8:
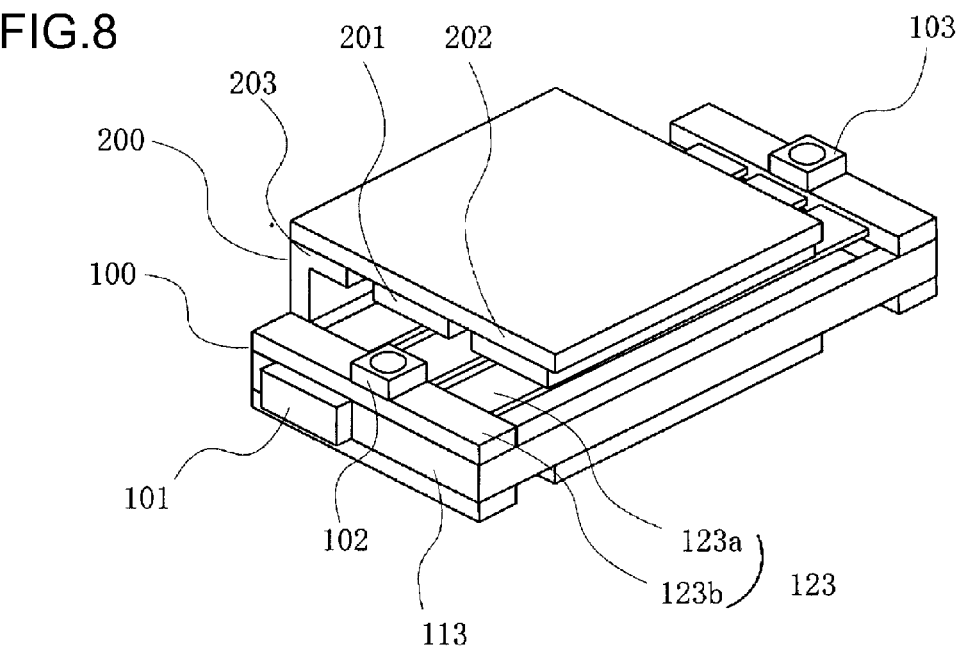
FIG. 8 is a perspective view illustrating an entirety of the canned linear motor of the fourth embodiment according to the present invention.
Figure 9:
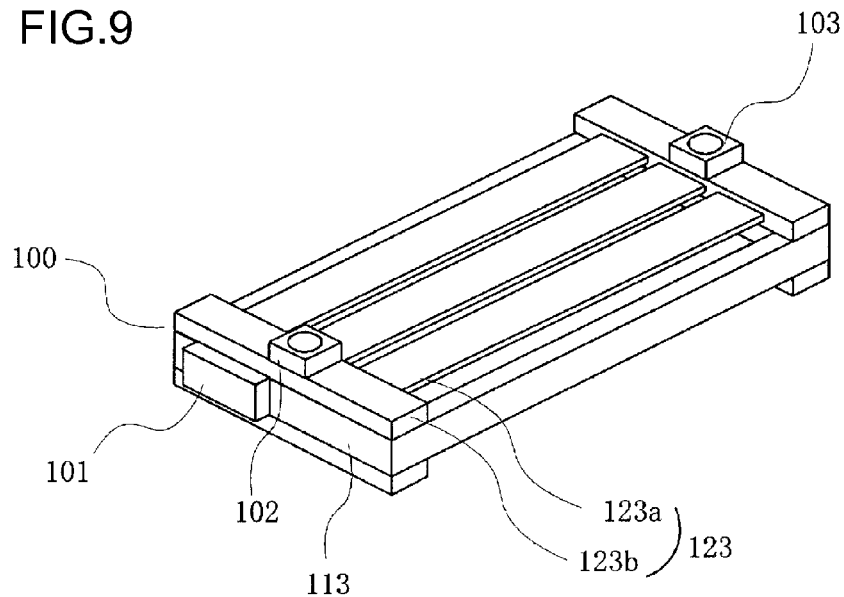
FIG. 9 is a perspective view illustrating the canned linear motor armature of the fourth embodiment according to the present invention.
Figure 10:
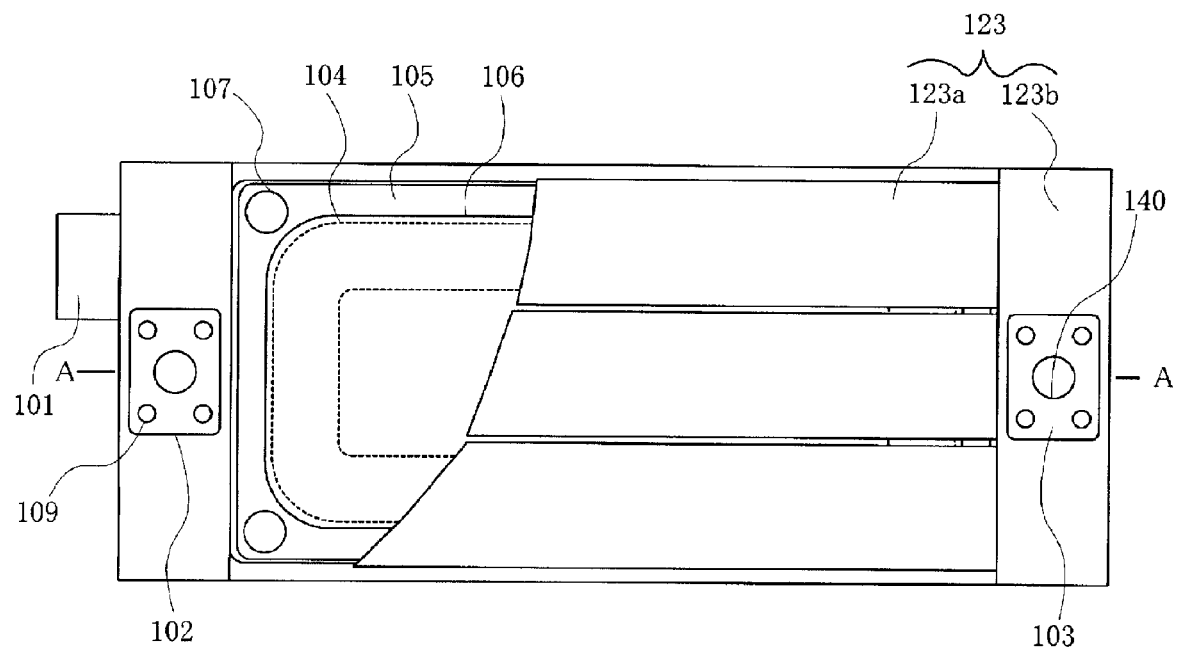
FIG. 10 is a plan view illustrating the armature viewed from an upper surface shown in FIG. 9, in which the can is partially cut out to illustrate positional relation between an armature winding and a substrate within the armature.
Figure 11:
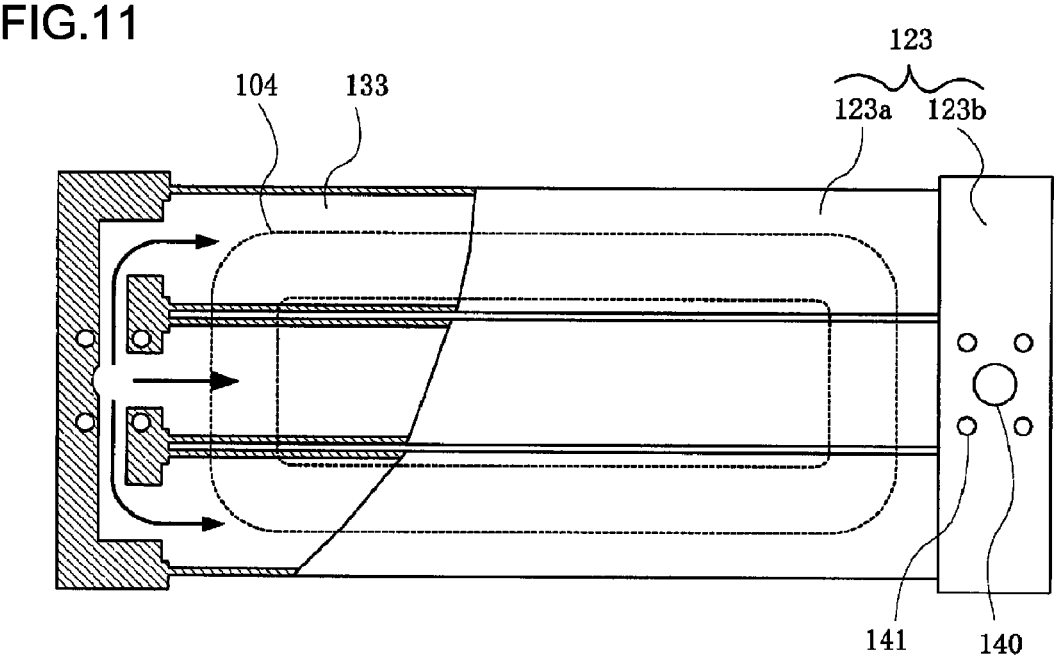
FIG. 11 is a plan view illustrating the armature viewed from the upper surface shown in FIG. 9, in which the can is partially cut out to illustrate positional relation between the armature winding and a refrigerant flow channel within the armature.
Figure 12:
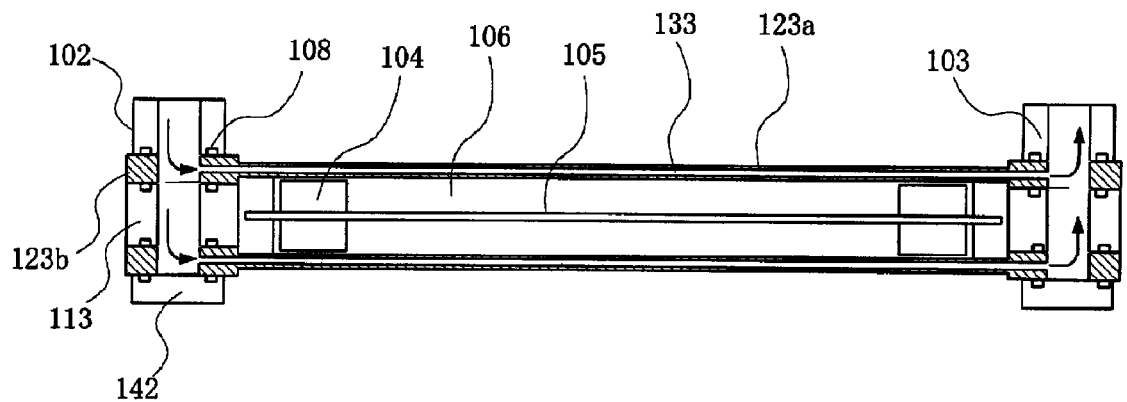
FIG. 12 is a side cross-sectional view of the armature taken along line A-A in FIG. 10.

FIG. 8 is a perspective view illustrating an entirety of the canned linear motor of the fourth embodiment according to the present invention, and FIG. 9 is a perspective view illustrating an entirety of the canned linear motor armature shown in FIG. 8. FIG. 10 is a plan view illustrating the armature viewed from an upper surface shown in FIG. 9, in which the can is partially cut out to illustrate positional relation between an armature winding and a substrate within the armature, and FIG. 11 is a plan view illustrating the armature viewed from the upper surface shown in FIG. 9, in which the can is partially cut out to illustrate positional relation between the armature winding and a refrigerant flow channel within the armature. FIG. 12 is a side cross-sectional view of the armature taken along line A-A in FIG. 10.

The fourth embodiment is different from the first to third embodiments in that, as shown in FIGS. 8 and 9, a can 123 is configured by three thin pipes 123a and a pair of square members 123b. The thin pipes 123a are each configured by such as a cylindrical pipe which constitutes the refrigerant flow channel therein and that is formed into a tabular shape, or a tabular pipe that is configured by folding a thin plate so as to form the refrigerant flow channel therein and brazing end surface of the thin plate. Referring to FIGS. 10 and 11, the square member 123b is provided with the channel port 140 through which the refrigerant comes in and out, and the piping is provided therein so as to connect from the channel port 140 to the flow channel of the thin pipe 123a. Three of the thin pipes 123a thus configured are disposed in line so as to be positioned on the coil side upper surface of the armature winding 104, and the square member 123b is disposed on each end surface, and the thin pipe 123a and the square member 123b are bonded by brazing, thereby integrally configuring the can 123. For the thin pipe 123a and the square member 123b, stainless steel that can be bonded by brazing is used.

Further, referring to FIG. 11, the square member 123b is also provided with the through hole 141 for letting the O-ring fixing bolt 109 shown in FIG. 10 be inserted. A casing 113 is also provided with the piping for supplying or discharging the refrigerant, thereby connecting to the channel port 140 of the square member 123b at the end of the piping. As shown in FIG. 10, the refrigerant supply port 102 and the refrigerant discharge port 103 are provided on the channel port 140, and fastened by the O-ring fixing bolt 109 so that no leakage can occur through the O-ring 108 between the refrigerant supply port 102 or the refrigerant discharge port 103 and the can 123 and the casing 113. Further, referring to FIG. 12, a surface that is away from a surface on which the refrigerant supply port 102 and the refrigerant discharge port 103 are attached is sealed by the cap 142. As shown by arrows in FIGS. 11 and 12, the refrigerant flows through three portions of the refrigerant flow channels 133 within the thin pipes 123a.

With the above configuration, similarly to the first embodiment, the refrigerant is not brought into direct contact with the armature winding and the molding resin covering the armature winding, and accordingly, it is possible to prevent the reduction of the insulation resistance of the armature winding or the insulation breakdown even when water is used as the refrigerant. Further, it is possible to efficiently recover the heat generated by the armature winding with the refrigerant, and the rise in the temperature of the armature winding can be greatly reduced. Further, as an eddy current 153 is segmentalized, it is possible to reduce the viscous braking force similarly to the third embodiment.

Fifth Embodiment

Next, a fifth embodiment according to the present invention is described.

Figure 13:
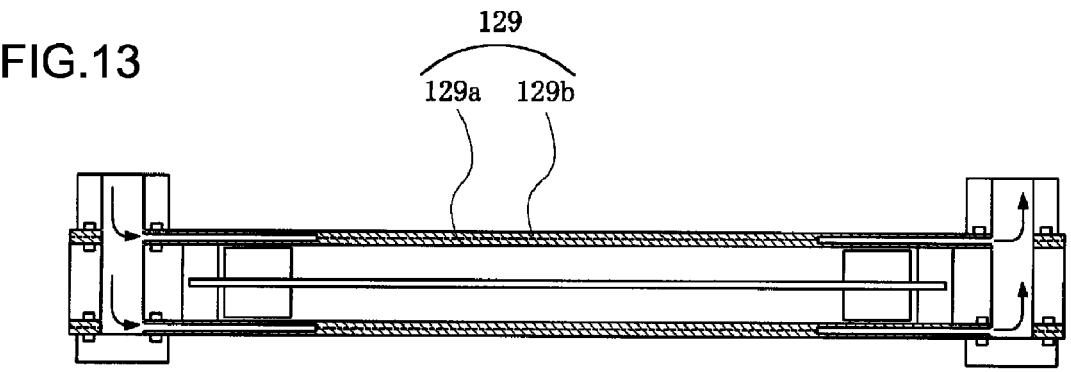
FIG. 13 is a side cross-sectional view showing a modified example of the armature of the fifth embodiment according to the present invention taken along line A-A in FIG. 10.

FIG. 13 is a side cross-sectional view showing a modified example of the armature of the fifth embodiment according to the present invention taken along line A-A in FIG. 10. Referring to FIG. 13, a reference symbol 129 represents a can, a reference symbol 129a represents a copper thin plated member, and a reference symbol 129b represents a stainless-steel thin plated member.

The fifth embodiment is different from the first embodiment in that the copper thin plated member 129a and the stainless-steel thin plated member 129b that are made of different kind of metals are integrally manufactured by diffusion bonding, and that the copper thin plated member 129a is provided on a side of the armature winding 104. It should be noted that thermal conductivity of copper is about 380 W/m·k, and thermal conductivity of stainless steel (SUS304) is 16 W/m·k, and the thermal conductivity of copper is 24 times as large as that of stainless steel.

With the above configuration, as the copper thin plated member having high thermal conductivity is provided on the coil side upper surface of the armature winding, the heat generated by the armature winding is conducted efficiently to the copper thin plated member. Further, as the stainless-steel thin plated member having the lower thermal conductivity is provided outside the copper thin plated member, the heat is not easily conducted to the surface of the can. In other words, it is possible to suppress the rise in the temperature of both the armature winding and the surface of the can.

Sixth Embodiment

Figure 14A:
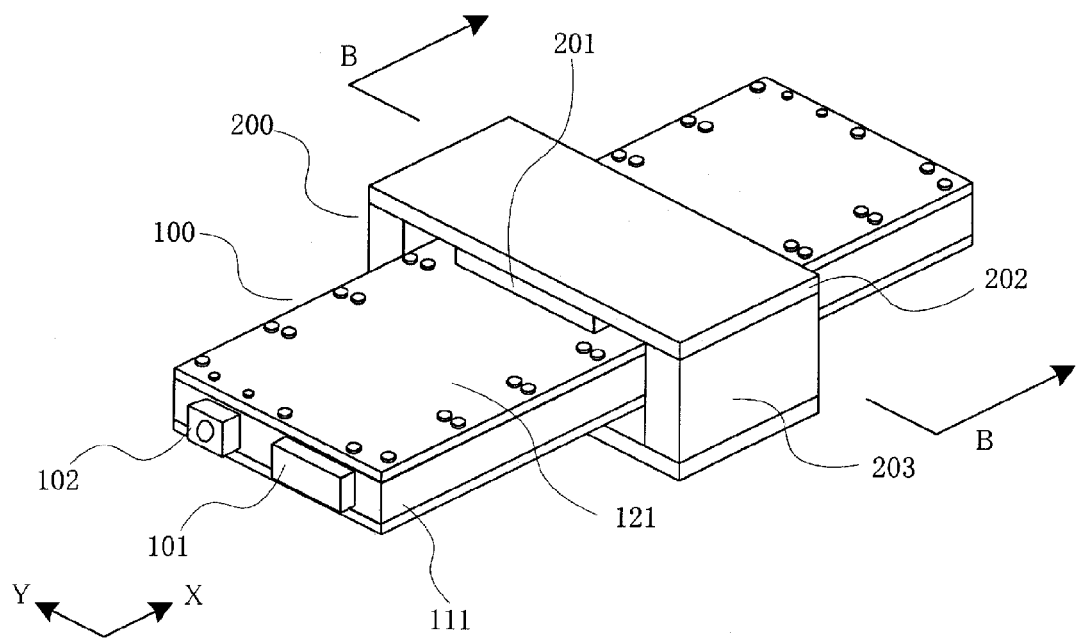
FIGS. 14A and 14B illustrate a canned linear motor common to sixth to eleventh embodiments of the present invention.
Figure 14B:
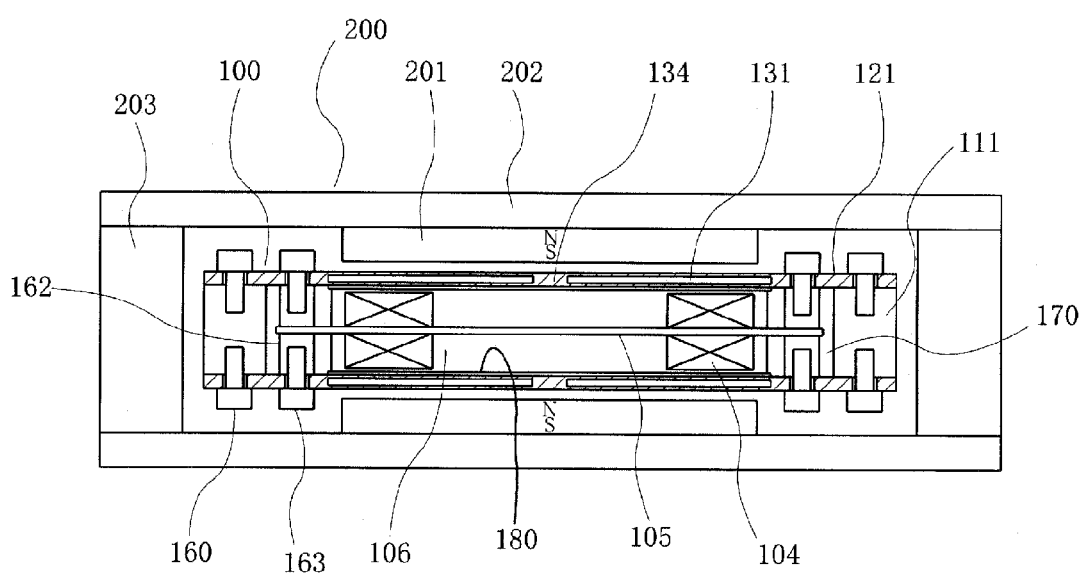
Figure 15:
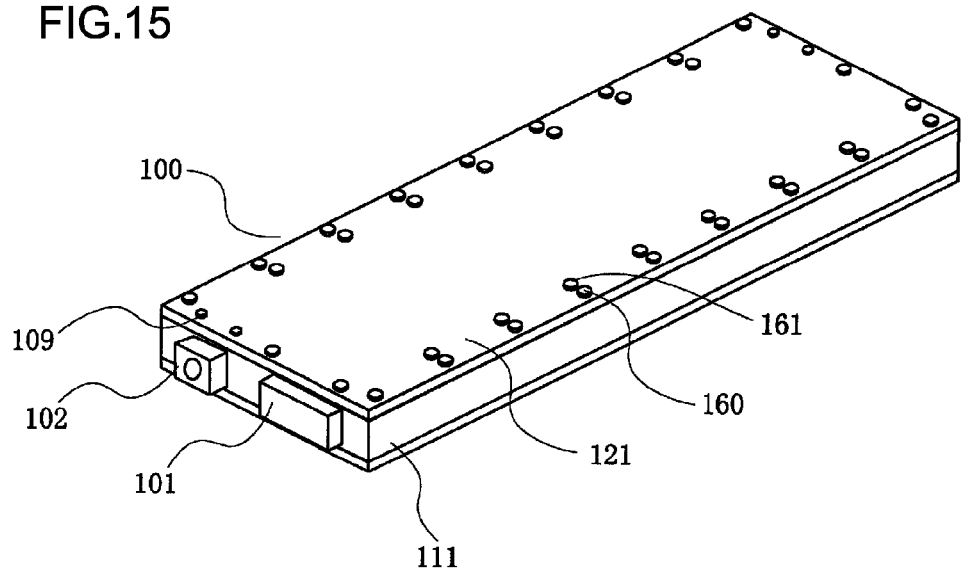
FIG. 15 is a perspective view illustrating a canned linear motor armature of the sixth embodiment according to the present invention.
Figure 16:
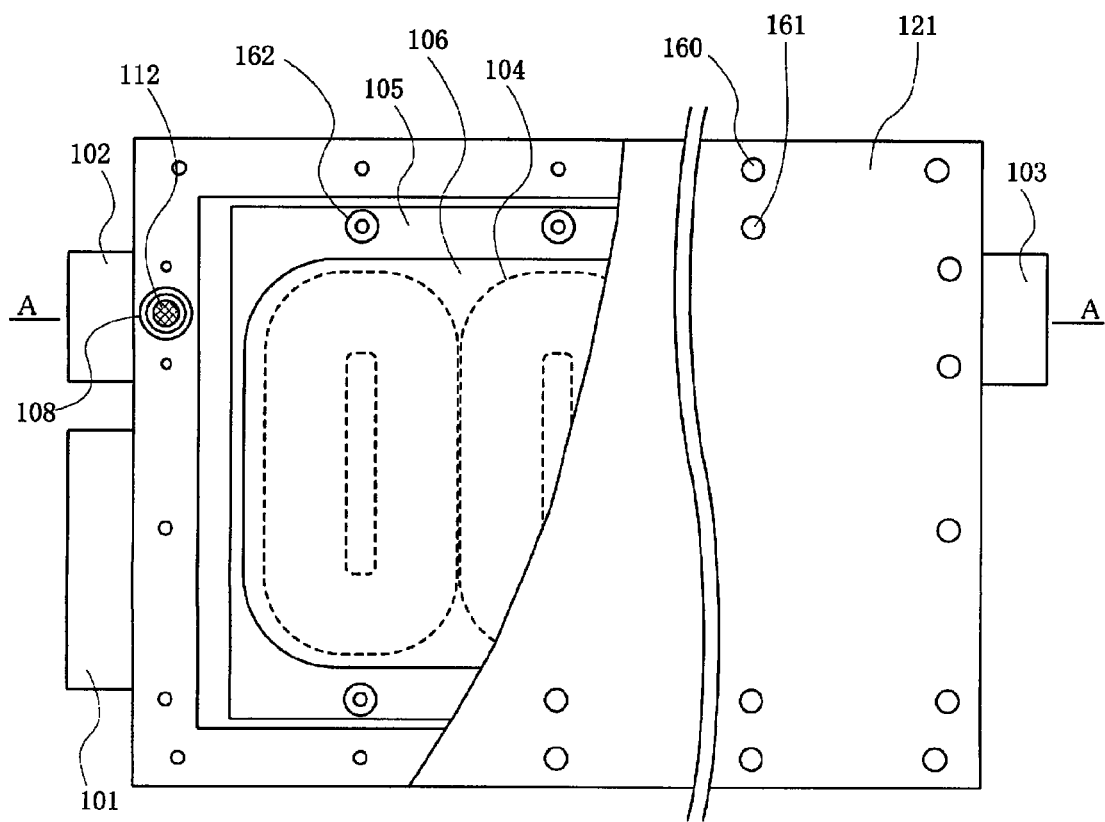
FIG. 16 is a plan view illustrating the armature viewed from an upper surface shown in FIG. 15, in which the can is partially cut out to illustrate positional relation between an armature winding and a substrate within the armature.
Figure 17:
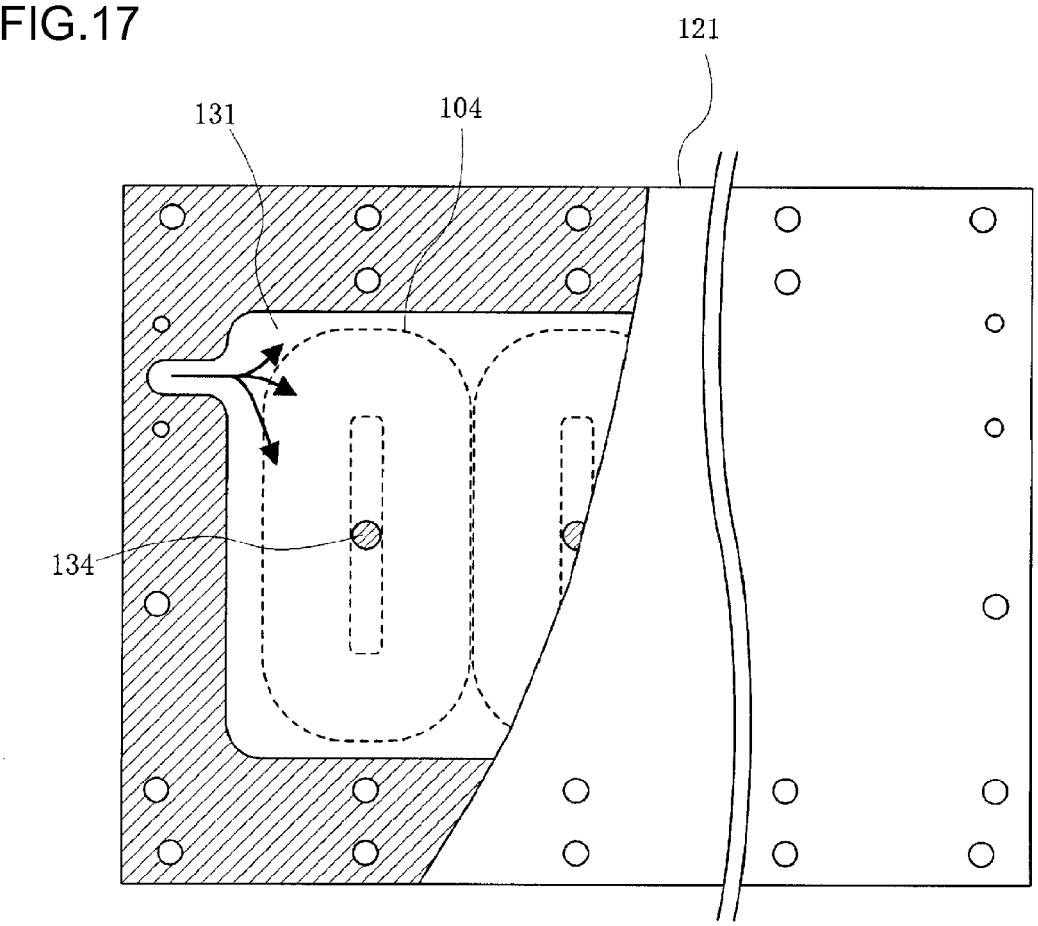
FIG. 17 is a plan view illustrating the can viewed from the upper surface shown in FIG. 15, in which the can is partially cut out to illustrate positional relation between a refrigerant flow channel and the armature winding.
Figure 18:
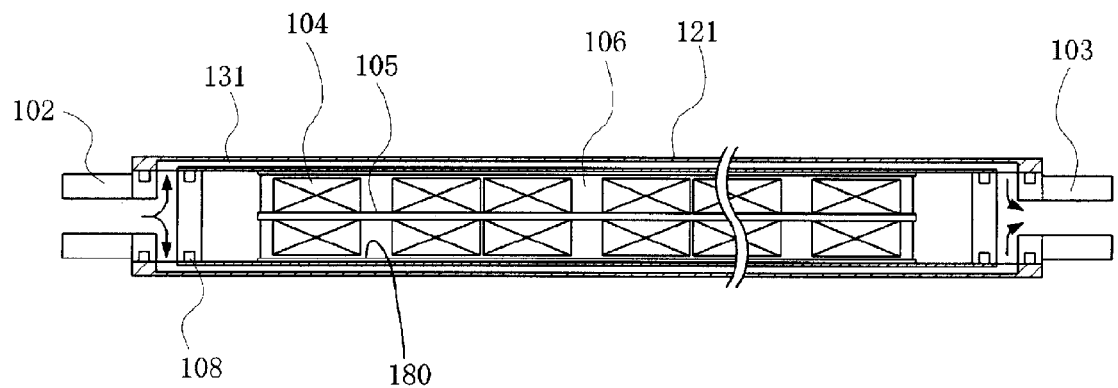
FIG. 18 is a side cross-sectional view of the armature taken along line A-A in FIG. 16.

FIGS. 14A and 14B illustrate a canned linear motor common to sixth to eleventh embodiments of the present invention, and FIG. 14A is a perspective view of an entirety of the canned linear motor, and FIG. 14B is an elevational cross-sectional view taken along line B-B viewed from X direction in FIG. 14A. Further, FIG. 15 is a perspective view illustrating a canned linear motor armature of the sixth embodiment according to the present invention, FIG. 16 is a plan view illustrating the armature viewed from an upper surface shown in FIG. 15, in which the can is partially cut out to illustrate positional relation of an armature winding within the armature, FIG. 17 is a plan view illustrating the can viewed from the upper surface shown in FIG. 15, in which the can is partially cut out to illustrate positional relation between the armature winding and a refrigerant flow channel, and FIG. 18 is a side cross-sectional view of the armature taken along line A-A in FIG. 16. It should be noted that like components of the present invention as in the conventional art are represented by the like reference symbols and not explained in detail, and the following description focuses on differences between the embodiment of the present invention and the conventional art. Here, configuration of a field 200 shown in FIG. 14B is the same as the conventional art.

In the figure, a reference symbol 134 represents a supporting member, and a reference symbol 162 represents a winding fixing member.

The embodiment of the present invention is different from the conventional art in that a refrigerant flow channel 131 is provided within a can 121 of a canned linear motor armature shown in FIG. 14B, in that the refrigerant flow channel 131 is provided on a upper surface of a concentrated winding coil side of the armature winding 104, in that the supporting member 134 within the refrigerant flow channel 131 is provided on an upper surface of a concentrated winding coil air-core of the armature winding 104, and in that the armature winding 104 is attached to the can 121, which is attached to the casing 111. Thus, the embodiment of the present invention is clearly distinguished from the configuration of the conventional art. As shown in FIGS. 14B and 16, the armature 100 is configured such that the armature windings 104 that are configured by concentrated winding coils are provided on both sides of the substrate 105 within the picture-frame-shaped casing 111, and are formed into a single piece by the molding resin 106 around the substrate 105 and the armature winding 104. A gap 170 is provided so as not to bring the single piece into contact with the casing 111, and the winding fixing member 162 provided at a periphery of the substrate 105 and the can 121 are fixed by the winding fixing bolt 163. At this time, the both openings of the casing 111 are covered by the can 121 from both sides. In FIG. 14B, a highly heat-conductive material 180 is interposed between the upper surface of the molding resin 106 and the can 121, and the armature winding 104 and the can 121 are brought into contact without any gap, thereby fixing to the casing 111 by the can fixing bolt 160 around the periphery of the can 121. Here, examples of the material of the casing include stainless steel that is a nonmagnetic material, titanium with which the specific gravity can be further reduced, and ceramic. GFRP is used for the substrate 105. As the highly heat-conductive material, such as thermal conductive silicone grease, thermal conductive silicone rubber sheet, or a heat dissipation sheet in which ceramic filler is mixed into a silicone resin, whose thermal conductivity is more than 1 W/m·k is used. Further, referring to FIGS. 16 and 18, the casing 110 is provided with a casing channel port 112 through which the refrigerant flows, the can 121, and a groove in which the O-ring 108 that encloses the casing channel port 112 is fitted in so as to prevent the leakage of the refrigerant. Further, the refrigerant supply port 102 and the refrigerant discharge port 103 are attached in front and rear of the casing 111.

On the other hand, the refrigerant flow channel 131 as shown in FIG. 17 is formed within the can 121. It should be noted that, in FIG. 17, the armature winding 104 is shown by dotted line so that positional relation between the refrigerant flow channel 131 and the supporting member 134, and the armature winding 104 can be easily seen. The can 121 is configured such that, as shown in FIGS. 14B and 18, a pair of thin plated members each having a recess portion formed on a surface are integrated so that the recess portions face each other. As the thin plated member of the can 121, a metal that can be integrated by diffusion bonding such as stainless steel or copper, or CFRP that can be integrated by bonding using an epoxy resin is used. Further, as shown in FIG. 17, an external form of the refrigerant flow channel 131 is formed to be slightly larger than an external form of the armature winding 104, and the supporting member 134 is provided on an upper surface of the concentrated winding coil air-core of the armature winding 104. When the refrigerant is supplied from the refrigerant supply port 102, as shown by arrows in FIGS. 17 and 18, the refrigerant flows through the refrigerant flow channel 131 within the can 121, and is discharged from the refrigerant discharge port 103. During this time, the refrigerant recovers heat from the armature winding 104 generated due to copper loss. Further, as the refrigerant, water (including pure water and ultrapure water) having a high thermal conductivity, a high specific heat, and an extremely high heat recovery capability is used.

With the above configuration, the refrigerant is not brought into direct contact with the armature winding as the refrigerant flow channels are provided within the can. As a result, it is possible to eliminate the problems of the reduction of the insulation resistance of the armature winding or the insulation breakdown even when water is used as the refrigerant. Further, it is possible to efficiently recover the heat generated by the armature winding with the refrigerant, and the rise in the temperature of the armature winding can be reduced because the refrigerant flow channel are provided on the upper surface of the concentrated winding coil side of the armature winding. Further, as the supporting member is provided on the upper surface of the concentrated winding coil air-core, the heat generated by the armature winding is not easily conducted to the supporting member, thereby reducing the rise in temperature of an entire surface of the can. Further, as the armature winding is attached to the can so that the gap is provided between the armature winding and the casing, the heat generated by the armature winding is not easily conducted to the casing, thereby reducing the rise in temperature of an entire surface of the armature. Further, the presence of the supporting member allows to suppress an outward expansion of the can even if the pressure of the refrigerant increases. Further, as no projecting portion for fixing the O-ring and the armature winding between the can and the casing is provided, it is possible to make the cross section of the casing smaller, thereby reducing the weight of the casing. Moreover, it is possible to remove the can retainer plate. Thus, it is possible to reduce the weight of the entire armature to a large extent.

Seventh Embodiment

Next, a seventh embodiment according to the present invention is described.

Figure 19:
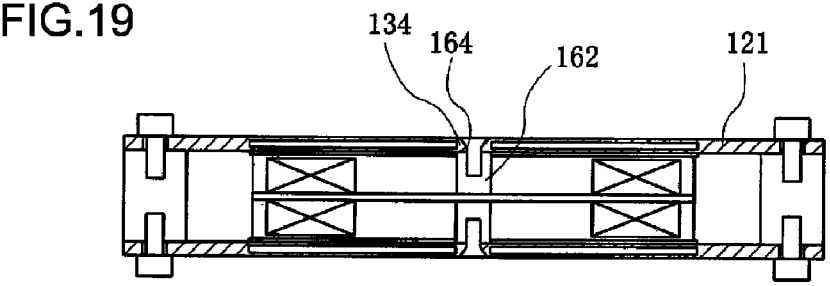
FIG. 19 is an elevational cross-sectional view taken along line B-B viewed from X direction in FIG. 14A in the seventh embodiment according to the present invention.

FIG. 19 is an elevational cross-sectional view taken along line B-B viewed from X direction in FIG. 14A in the seventh embodiment, in which only the armature is shown. The seventh embodiment is different from the sixth embodiment in that the winding fixing member 162 is provided on the concentrated winding coil air-core of the armature winding 104, and fixed to the supporting member 134 of the can 121 using a winding fixing countersunk head screw 164.

With the above configuration, an effect similar to that of the sixth embodiment can be provided. In particular, when the armature is required to have a small width, it is possible to make the width of the armature smaller in comparison with the case where the winding fixing members are provided on the both left and right sides of the armature winding as in the sixth embodiment.

Eighth Embodiment

Next, an eighth embodiment according to the present invention is described.

Figure 20:
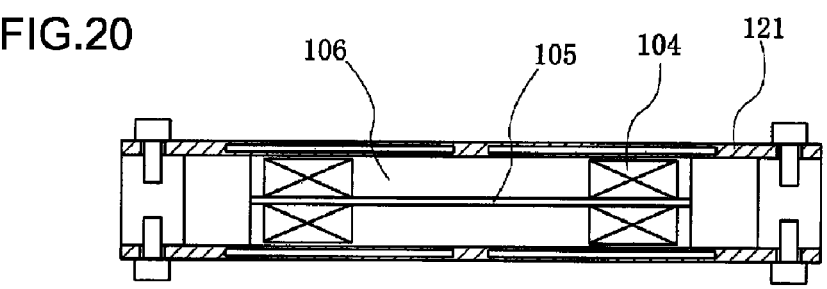
FIG. 20 is an elevational cross-sectional view taken along line B-B viewed from X direction in FIG. 14A in the eighth embodiment according to the present invention.

FIG. 20 is an elevational cross-sectional view taken along line B-B viewed from X direction in FIG. 14A in the eighth embodiment, in which only the armature is shown. The eighth embodiment is different from the sixth embodiment in that the winding fixing member and the winding fixing bolt are not provided, and the armature winding 104, the substrate 105, and the can 121 are integrated by bonding using the molding resin 106.

With the above configuration, the same effect as in the sixth and seventh embodiments can be provided. Further, while the bolts and screws for mechanical fastening are necessary in the sixth and seventh embodiments, such components are not used in the eighth embodiment. Accordingly, it is possible to further reduce the weight of the armature.

Ninth Embodiment

Next, a ninth embodiment according to the present invention is described.

Figure 21:
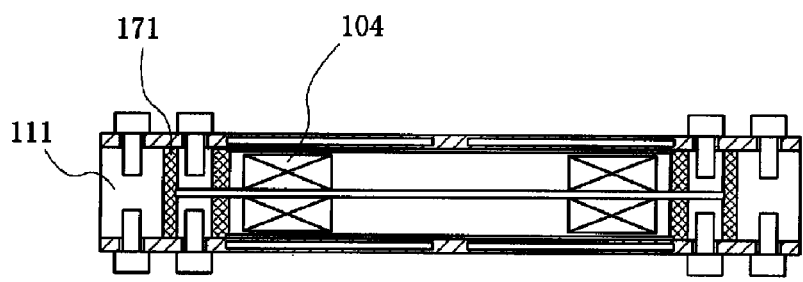
FIG. 21 is an elevational cross-sectional view taken along line B-B viewed from X direction in FIG. 14A in the ninth embodiment according to the present invention.

FIG. 21 is an elevational cross-sectional view taken along line B-B viewed from X direction in FIG. 14A in the ninth embodiment, in which only the armature is shown. The ninth embodiment is different from the sixth embodiment in that a thermal insulation material 171 is inserted into the gap 170 provided between the armature winding 104 and the casing 111 in the sixth embodiment. As the thermal insulation material 171, glass wool whose thermal conductivity is smaller than 0.05 W/m·k or urethane foam, or a vacuum thermal insulation material in which such as urethane foam, polyester, or glass wool is used as a core material is used.

With the above configuration, it is possible to reduce the rise in temperature of the casing by suppressing the heat conducted from the armature winding to the casing via the gap. As a result, it is possible to reduce the rise in temperature of an entire surface of the armature in addition to an entire surface of the can.

Tenth Embodiment

Next, a tenth embodiment according to the present invention is described.

Figure 22A:
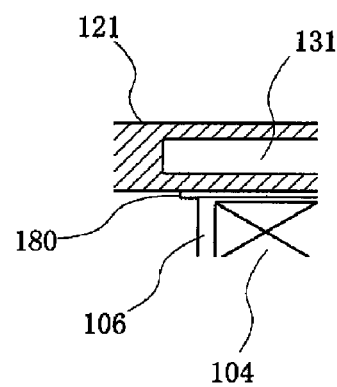
FIG. 22A is an enlarged view illustrating a joining portion between the armature winding and the can of the sixth embodiment.
Figure 22B:
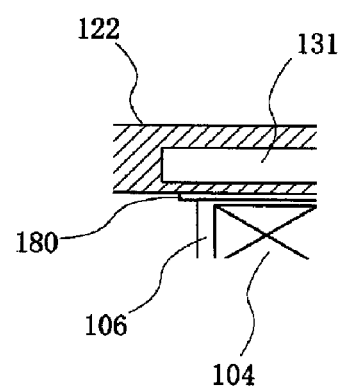
FIG. 22B is an enlarged view illustrating a joining portion between the armature winding and the can of the tenth embodiment.

FIGS. 22A and 22B are elevational cross-sectional views taken along line B-B viewed from X direction in FIG. 14A in the tenth embodiment, showing an enlarged view illustrating a joining portion between the armature winding and the can. FIG. 22A illustrates the can 121 and the refrigerant flow channel 131 in the sixth embodiment, and the refrigerant flow channel 131 is positioned at a center of the can 121. On the other hand, FIG. 22B illustrates the can 122 and the refrigerant flow channel 131 in the tenth embodiment. Although the shape of the refrigerant flow channel 131 is the same, the refrigerant flow channel 131 in whole is provided on the side of the armature winding 104 from the center of the can 122.

With the above configuration, the thermal resistance from the armature winding to the refrigerant flow channel can be reduced, and the thermal resistance from the refrigerant flow channels to the surface of the can be increased. As a result, it is possible to reduce the rise in temperature of the armature winding and the surface of the can in comparison with the sixth embodiment.

Eleventh Embodiment

Next, an eleventh embodiment is described.

Figure 23A:
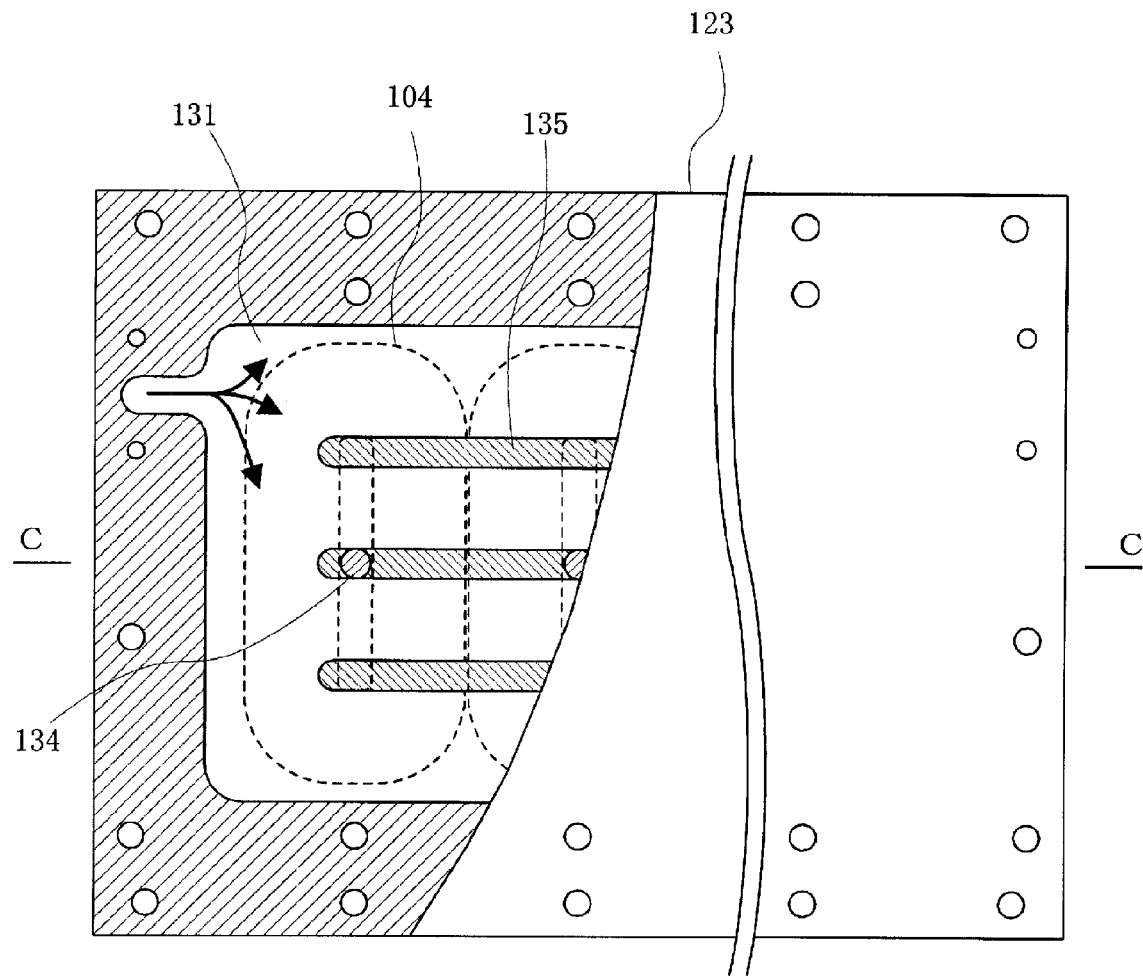
FIG. 23A is a plan view illustrating the can viewed from the upper surface of the armature according to the eleventh embodiment, in which the surface of the can is partially cut out to illustrate the positional relation between the refrigerant flow channel and the armature winding.
Figure 23B:
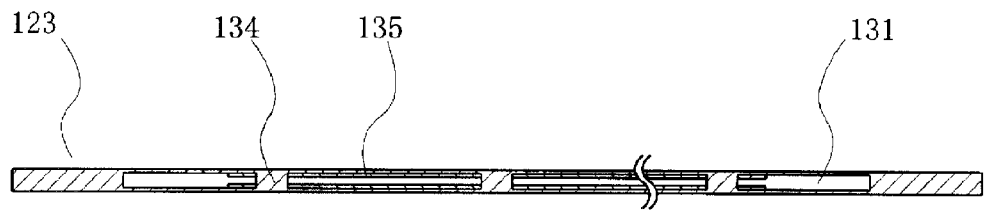
FIG. 23B is a side cross-sectional view taken along line C-C in FIG. 23A.

FIG. 23A is a plan view illustrating the can of the eleventh embodiment viewed from the upper surface of FIG. 15, in which the can is partially cut out to illustrate the positional relation between the armature winding and the refrigerant flow channel. FIG. 23B is a side cross-sectional view taken along line C-C in FIG. 23A. The eleventh embodiment is different from the sixth embodiment in that a projecting portion 135 projecting toward the refrigerant flow channel 131 is provided within the can 123. The projecting portion 135 is, unlike the supporting member 134, projecting while leaving a gap for the refrigerant to pass. Further, the projecting portion 135 is formed in a rod shape in X direction of the armature, and provided so as not to block the refrigerant flow through the refrigerant flow channel 131.

With the above configuration, it is possible to increase rigidity of the can without increasing the pipe resistance, and it is possible to suppress an outward expansion of the can even when the pressure is increased by increasing the flow rate of the refrigerant.

While the shape of the field is the substantial U-shape in the first to fifth embodiments, it should be appreciated that the present invention can be realized by a substantial O-shape or a structure in which permanent magnets are arranged on one side (gap facing). Further, while the O-ring fixing bolt is used for the fixation of the can to the casing in the first embodiment, it is possible to fix the joining surface with the casing by an adhesive material or by providing four holes at four corners and fixing with bolts (not shown). Moreover, while the present invention is described taking a voice coil motor (VCM) having a single concentrated winding coil as an example, the armature winding can be provided as a three-phase alternating current linear motor configured by a plurality of concentrated winding coils, or a VCM in which a plurality of concentrated winding coils are provided for a single armature, thereby allowing to drive a plurality of movers.

While the shape of the field is the substantial O-shape in the sixth to eleventh embodiments, it should be appreciated that the present invention can be realized by a substantial U-shape or a structure in which permanent magnets are arranged on one side (gap facing). Further, while the armature winding is described as a three-phase alternating current linear motor configured by a plurality of concentrated winding coils, the armature winding can be a voice coil motor (VCM) having a single concentrated winding coil, or a VCM in which a plurality of concentrated winding coils are provided for a single armature, thereby allowing to drive a plurality of movers. Further, while such a configuration is employed that the pair of carbon fiber reinforced plastic thin plated members each having the recess portion on the surface are bonded so that the recess portions face each other, the thin plated members can be integrated by mechanically fastening with the O-ring or a packing is inserted therebetween so that the recess portions face each other.

Twelfth Embodiment

Next, a twelfth embodiment according to the present invention is described. The twelfth embodiment and embodiments according to the present invention that are described after the twelfth embodiment assume the linear motor described in the first to eleventh embodiments with longer strokes, and describe several means of extending the can including the refrigerant flow channels according to the length of the armature of the linear motor extending in a direction along which the thrust force is generated.

Figure 24A:
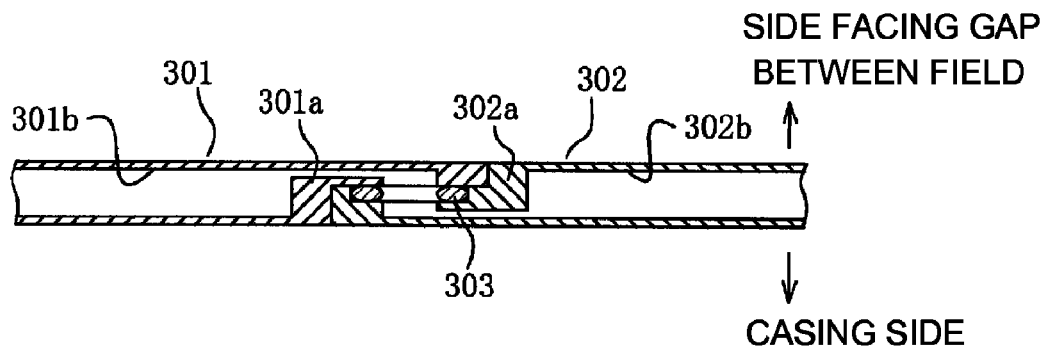
FIGS. 24A and 24B illustrate a can connecting portion of the canned linear motor armature of a twelfth embodiment according to the present invention.
Figure 24B:
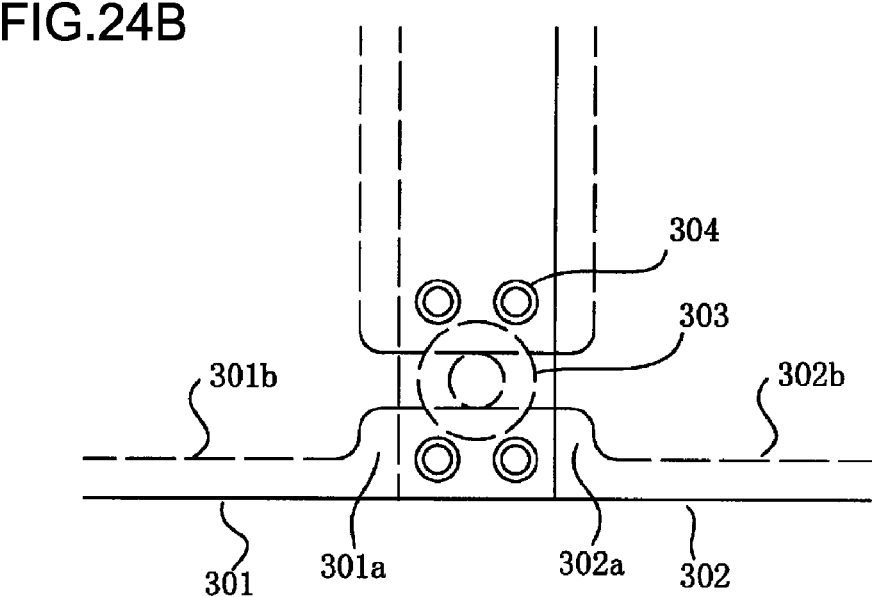
Figure 25:
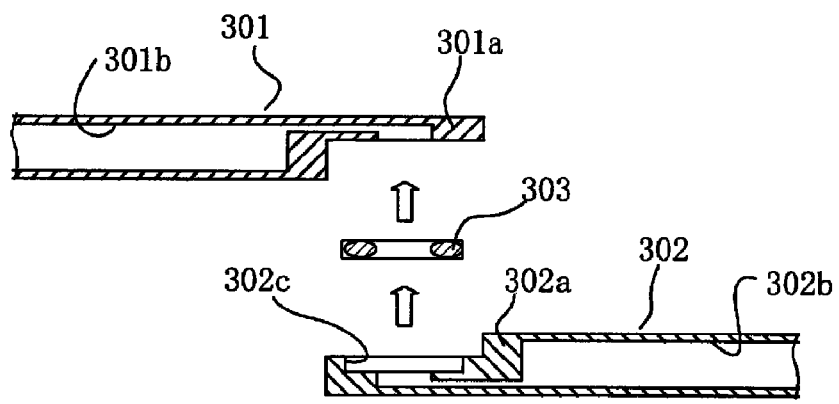
FIG. 25 is an exploded side cross-sectional view of the can connecting portion shown in FIGS. 24A and 24B.
Figure 26:
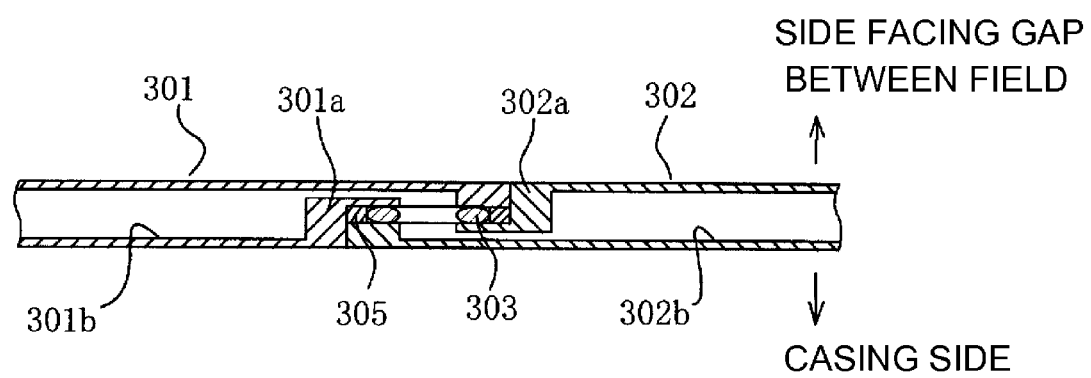
FIG. 26 is a side cross-sectional view illustrating the can connecting portion of the canned linear motor armature of a modified embodiment of the twelfth embodiment according to the present invention.
Figure 27:
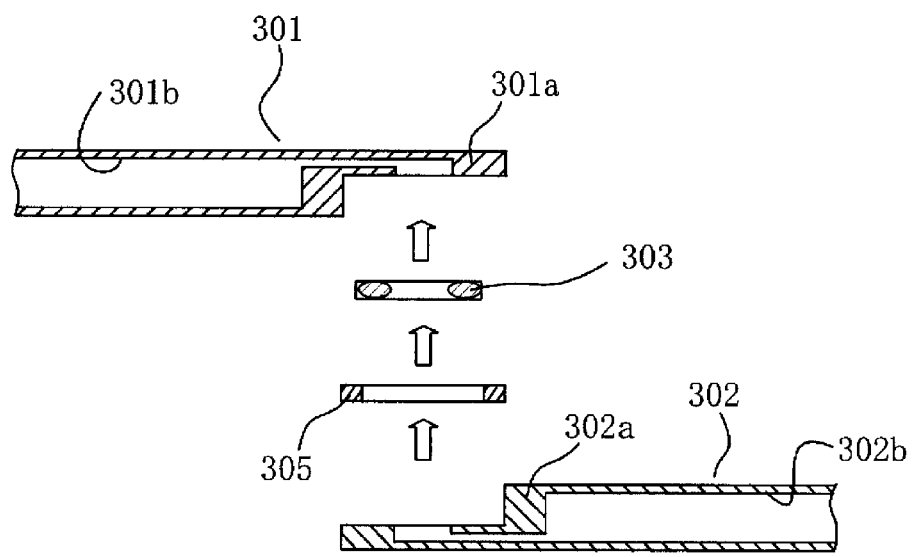
FIG. 27 is an exploded side cross-sectional view of the can connecting portion shown in FIG. 26.

FIGS. 24A and 24B illustrate a can connecting portion of the canned linear motor armature of the twelfth embodiment according to the present invention, and FIG. 24A is a side cross-sectional view of the can connecting portion, and FIG. 24B is a plan view of FIG. 24A, and FIG. 25 is an exploded side cross-sectional view of the can connecting portion shown in FIGS. 24A and 24B. FIG. 26 is a side cross-sectional view illustrating the can connecting portion of the canned linear motor armature of a modified embodiment of the twelfth embodiment according to the present invention, and FIG. 27 is an exploded side cross-sectional view of the can connecting portion shown in FIG. 26.

First, major characteristics of the means of extending the can including the refrigerant flow channels in the direction of the thrust force are that at least two cans are used, and the refrigerant flow channels within the can are connected to extend within a range of the width of the can in a direction that is perpendicular to the direction of the thrust force.

Specifically, referring to FIGS. 24A and 25, the cans include a first can 301 and a second can 302, each having a shape stepped in a thickness direction so that one of both ends of each can in an axial direction is a connecting portion of the can, and provided with stepped portions 301a and 302a communicated to the refrigerant channel, and the stepped portion 301a is fitted with the stepped portion 302a in such a manner that the stepped portion 301a faces the stepped portion 302a upside down to each other. With this arrangement, the refrigerant channels 301b and 302b within the cans can be connected to extend within the range of the width of each can in the direction that is perpendicular to the direction of the thrust force.

Further, referring to FIG. 25, a contact portion between the stepped portions of the first can 301 and the second can 302 are sealed by providing the stepped portion 302a of the second can 302 with a recess portion 302c, and by providing the recess portion 302c with an O-ring 303. Then, as shown in FIG. 24B, using the stepped portions of the first can 301 and the second can 302, the first can 301 and the second can 302 are fixed to the casings that are respectively in close contact with the cans 301 and 302 and not shown in the figure by mechanical coupling using such as a bolt screw 304.

Further, there are other embodiments as shown in FIGS. 26 and 27. Instead of providing the recess portion for fixedly providing the O-ring shown in FIG. 24 for the can, as shown in FIGS. 26 and 27, a spacer 305 that is a separate member from the can may be provided for the second can 302.

When connecting to extend in the direction of the thrust force by using the two cans as described above, the linear motor does not increase its size in cross section or its weight by the extensive connection means of the can, and thus the linear motor having a long stroke can be realized.

Thirteenth Embodiment

Next, a thirteenth embodiment according to the present invention is described.

Figure 28A:
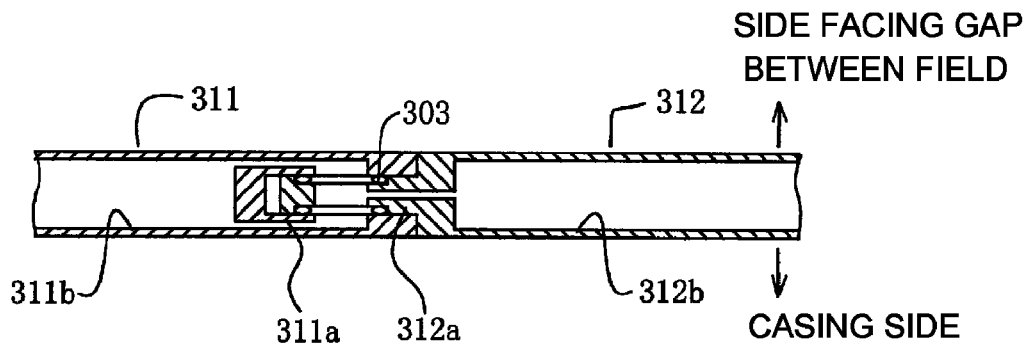
FIGS. 28A and 28B illustrate the can connecting portion of the canned linear motor armature of a thirteenth embodiment according to the present invention.
Figure 28B:
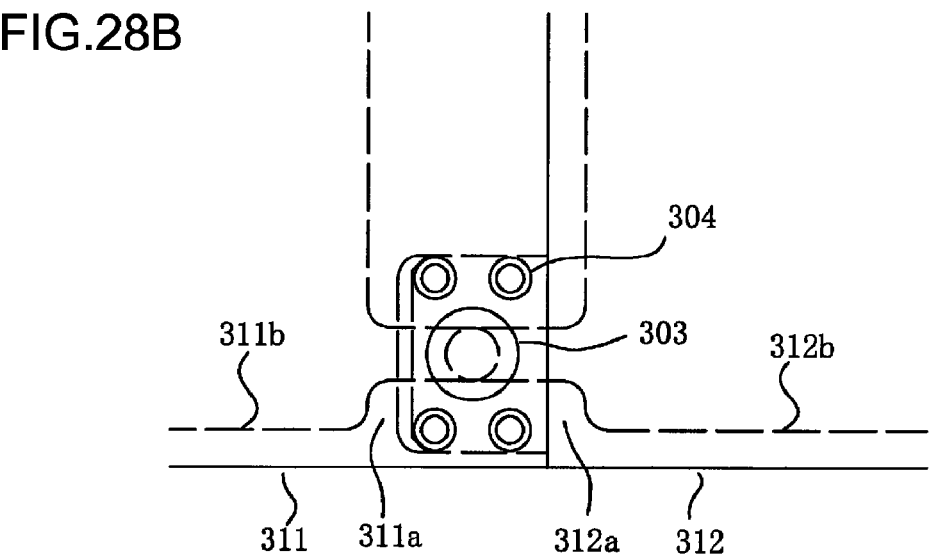
Figure 29:
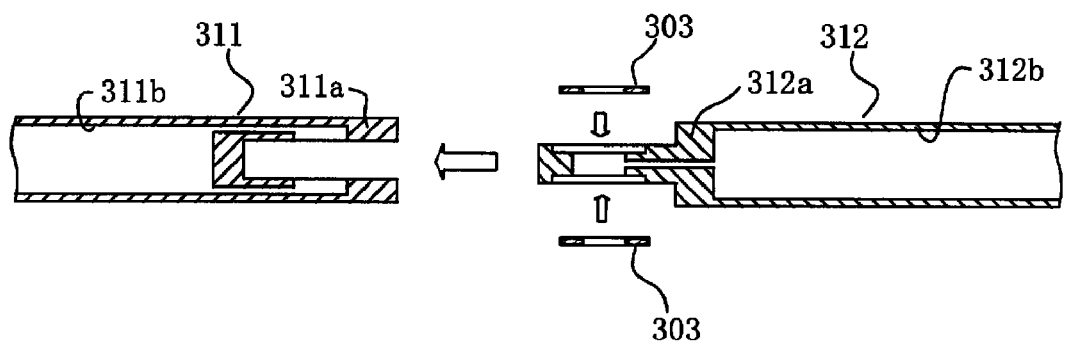
FIG. 29 is an exploded side cross-sectional view of the can connecting portion shown in FIGS. 28A and 28B.

FIGS. 28A and 28B illustrate the can connecting portion of the canned linear motor armature of the thirteenth embodiment according to the present invention, and FIG. 28A is a side cross-sectional view of the can connecting portion, and FIG. 28B is a plan view of FIG. 28A, and FIG. 29 is an exploded side cross-sectional view of the can connecting portion shown in FIGS. 28A and 28B.

The thirteenth embodiment is different from the twelfth embodiment in that, as shown in FIGS. 28A and 29, a connecting portion of a first can 311 includes a recess portion 311a, and a connecting portion of a second can 312 includes a projecting portion 312a so that one of both ends of each can in an axial direction is a connecting portion of the can, and that the connecting portions each constituted by the recess portion 311a and the projecting portion 312a of the respective cans are fitted with each other so as to be communicated to refrigerant channels 311b and 312b included in the both cans.

While the can 312 is provided with a portion for providing the O-ring 303 in FIGS. 28A and 28B, the portion for providing the O-ring 303 may be provided for the can 311.

It is possible to connect to extend in the direction of the thrust force using the two cans by fixedly providing by mechanical coupling the can 311 and the can 312, with the O-ring 303 interposed therebetween as shown in FIG. 28B, to the respective casings not shown in the figure. In addition, the linear motor does not increase its size in cross section or its weight, and thus the linear motor having a long stroke can be realized.

Fourteenth Embodiment

Next, a fourteenth embodiment according to the present invention is described.

Figure 30A:
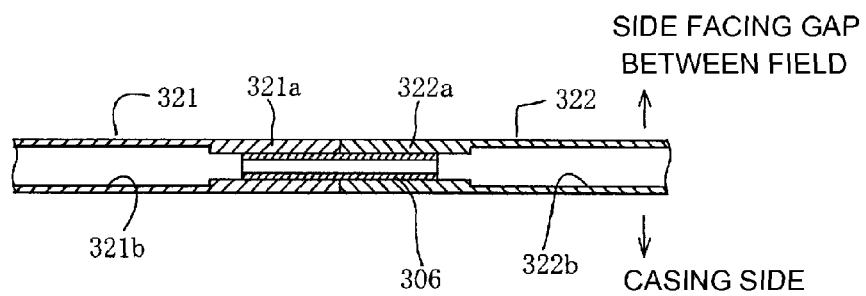
FIGS. 30A and 30B illustrate the can connecting portion of the canned linear motor armature of the fourteenth embodiment according to the present invention.
Figure 30B:
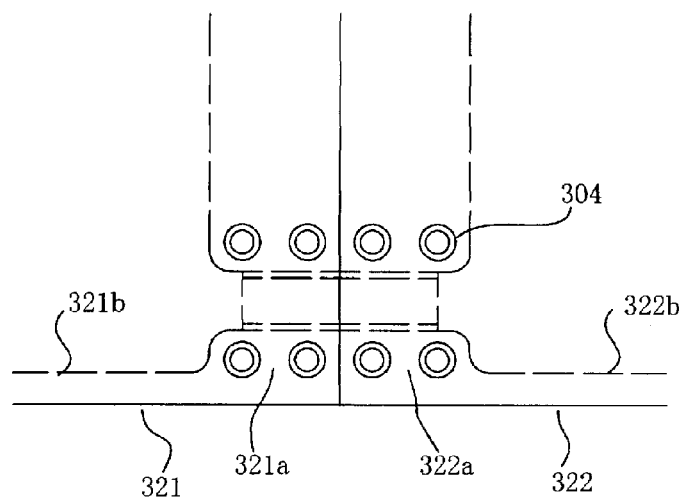
Figure 31:
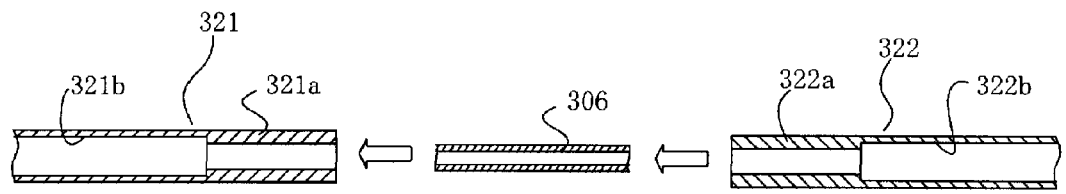
FIG. 31 is an exploded side cross-sectional view of the can connecting portion shown in FIGS. 30A and 30B.

FIGS. 30A and 30B illustrate the can connecting portion of the canned linear motor armature of the fourteenth embodiment according to the present invention, and FIG. 30A is a side cross-sectional view of the can connecting portion, and FIG. 30B is a plan view of FIG. 30A, and FIG. 31 is an exploded side cross-sectional view of the can connecting portion shown in FIG. 30.

The fourteenth embodiment is different from the twelfth embodiment in that, in FIGS. 30A and 31, one ends respectively of a first can 321 and a second can 322 in the axial direction include connecting portions 321a and 322a that extend linearly and communicate to refrigerant channels 321b and 322b included in the respective cans, and that a hollow joint 306 is fitted into each connecting portion of the corresponding can so as to be facing each other in series. In this manner, it is possible to connect within the range of the width of each can in the direction that is perpendicular to the direction of the thrust force.

It is possible to connect to extend in the direction of the thrust force using the two cans by fixedly providing by mechanically coupling the can 321 and the can 322 using such as the bolt screw 304, with the joint 306 interposed therebetween, to the respective casings not shown in the figure. In addition, the linear motor does not increase its size in cross section or its weight, and thus the linear motor having a long stroke can be realized.

Fifteenth Embodiment

Next, a fifteenth embodiment according to the present invention is described.

Figure 32A:
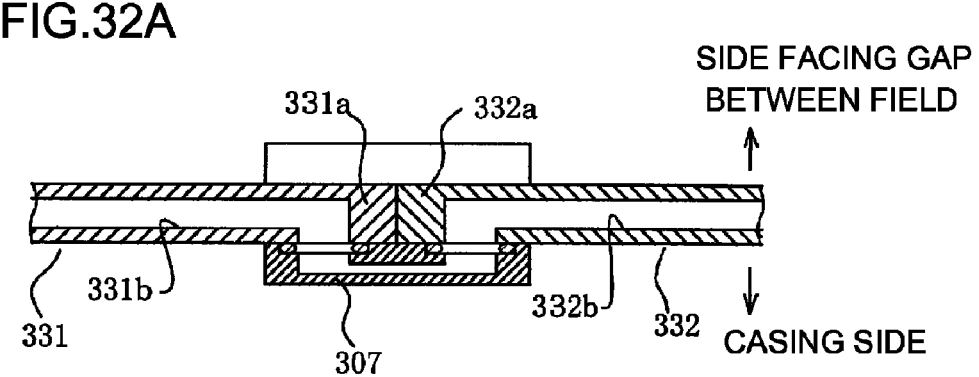
FIGS. 32A and 32B illustrate the can connecting portion of the canned linear motor armature of the fifteenth embodiment according to the present invention.
Figure 32B:
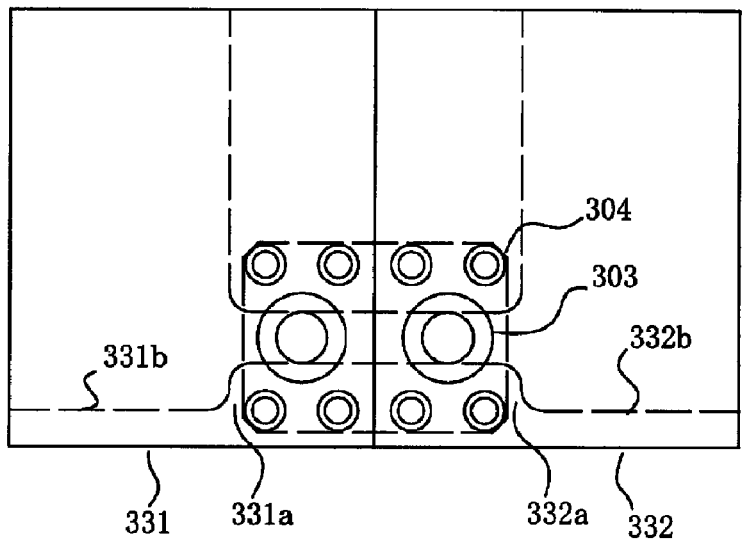
Figure 33:
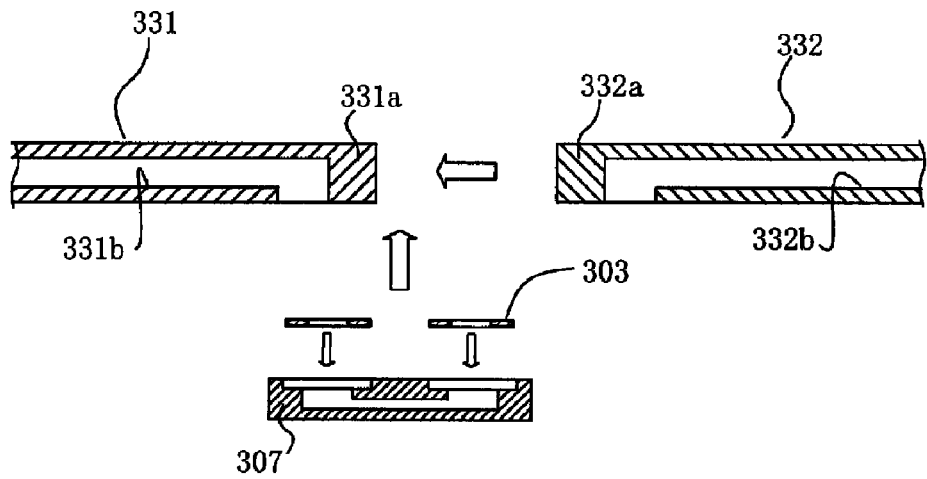
FIG. 33 is an exploded side cross-sectional view of the can connecting portion shown in FIGS. 32A and 32B.

FIGS. 32A and 32B illustrate the can connecting portion of the canned linear motor armature of the fifteenth embodiment according to the present invention, and FIG. 32A is a side cross-sectional view of the can connecting portion, and FIG. 32B is a plan view of FIG. 32A, and FIG. 33 is an exploded side cross-sectional view of the can connecting portion shown in FIG. 32.

A characteristic of the fifteenth embodiment is that, in FIGS. 32 and 33, one ends respectively of a first can 331 and a second can 332 in the axial direction include connecting portions 331a and 332a that extend in an L-shape and communicate to refrigerant channels 331b and 332b included in the respective cans, and that a hollow joint 307 is fitted into each connecting portion of the corresponding can so as to be facing each other in parallel. Further, the O-ring 303 is interposed between the cans 331 and 332, and the joint 307, and each can is fixedly provided by mechanical coupling using such as the bolt screw 304 to the respective casings not shown in the figure.

As described in the twelfth to fifteenth embodiments, by manufacturing the can, or the can and the joint by diffusion bonding the stainless-steel or the copper thin plated member, or by adhesively bonding or mechanical fastening the carbon fiber reinforced plastic thin plated members, it is possible to connect the refrigerant flow channel with an adjacent refrigerant flow channel to extend, thereby allowing the connection with high reliability against the leakage of the refrigerant, and it is possible to reduce the size and the weight of the armature or the canned linear motor.

According to the embodiment of the present invention, an armature winding of a water-cooling canned linear motor is enclosed with a frame-shaped casing, and both openings of the casing is sealed with a tabular can, and a plurality of refrigerant flow channels are provided within the can, and the refrigerant flow channels are provided on the coil side upper surface of the armature winding. By such a configuration, the present invention can be used in applications such as stage driving of a semiconductor manufacturing equipment, table feeding of a machine tool, and inspection apparatus that require the suppression of the rise in temperature of the surface of the linear motor and the armature winding, an improvement of the insulation reliability, the reduction of the weight of the armature, and the reduction of the viscous braking force.

According to an embodiment of the present invention, a plurality of refrigerant flow channels are provided within the can, and the refrigerant is not brought into direct contact with the armature winding and the molding resin covering the armature winding. As a result, it is possible to eliminate the problems of the reduction of insulation resistance of the armature winding or the insulation breakdown even when water is used as the refrigerant. Further, the refrigerant flow channels are provided on the coil side upper surface of the armature winding, it is possible to efficiently recover the heat generated by the armature winding with the refrigerant, and the rise in the temperature of the armature winding can be greatly reduced. Further, by the refrigerant recovering the heat, the heat is conducted from the refrigerant to the can, and to an entire can. As the heat is diffused in the can as a whole and dissipated, the rise in the surface temperature of the can can also be reduced. Moreover, the refrigerant flow channels within the can are made small in comparison with the conventional example, and accordingly it is possible to suppress an outward expansion of the can due to the pressure of the refrigerant.

According to an embodiment of the present invention, as the refrigerant flow channels are formed into a serpentine shape, a heat transfer area becomes large at the coil side upper surface. Thus, the rise in the temperature of the armature winding can be further reduced in comparison with the first aspect.

According to an embodiment of the present invention, it is possible to reduce the viscous braking force as an eddy current is segmentalized by a long hole provided for the can. Further, as the long hole is provided for the can at a thick portion so as not to be brought into contact with the refrigerant flow channel, no leakage of the refrigerant through the long hole occurs at all.

According to an embodiment of the present invention, the can is integrally formed by diffusion bonding a pair of thin plated members, or by bonding a plurality of thin pipe and a square member by brazing, so that the refrigerant flow channels are formed within the can. Therefore, the same effects as in the first to third aspects can be obtained.

According to an embodiment of the present invention, the copper thin plated member having high thermal conductivity is provided on the coil side upper surface of the armature winding, thereby the heat generated by the armature winding is conducted efficiently to the copper thin plated member, and as the stainless-steel thin plated member having the lower thermal conductivity is provided for the other can, the heat is not easily conducted to the surface of the can. Therefore, it is possible to suppress the rise in the temperature of both the armature winding and the surface of the can.

According to an embodiment of the present invention, a refrigerant flow channel is provided within the can, and the refrigerant is not brought into direct contact with the armature winding. As a result, it is possible to eliminate the problems of the reduction of insulation resistance of the armature winding or the insulation breakdown even when water is used as the refrigerant.

Further, it is possible to efficiently recover the heat generated by the armature winding with the refrigerant, and the rise in the temperature of the armature winding can be reduced because the refrigerant flow channel is provided on the upper surface of the concentrated winding coil side of the armature winding.

Further, as the supporting member is provided on the upper surface of the concentrated winding coil air-core, the heat generated by the armature winding is not easily conducted to the supporting member, thereby reducing the rise in temperature of an entire surface of the can.

Further, as the armature winding is attached to the can so that the gap is provided between the armature winding and the casing, the heat generated by the armature winding is not easily conducted to the casing, thereby reducing the rise in temperature of an entire surface of the armature.

Further, the presence of the supporting member allows to suppress an outward expansion of the can even if the pressure of the refrigerant increases. Further, as no projecting portion for fixing the O-ring and the armature winding between the can and the casing is provided, it is possible to make the cross section of the casing smaller, thereby reducing the weight of the casing. Therefore, it is possible to remove the can retainer plate, thereby reducing the weight of the entire armature to a large extent.

According to an embodiment of the present invention, a winding fixing member for fixing the armature winding is provided, and the winding fixing member and the can are mechanically fastening, and a counteraction of the thrust force applied to the armature winding is supported by the casing via the can. Therefore, the armature can generate a sufficient thrust force, and the same effect as in the seventh aspect can be obtained. In particular, as the armature winding is fixed to the can by the winding fixing member, a projecting portion for fixing the armature winding provided for the conventional casing is not provided, thereby further reducing the weight of the casing.

According to an embodiment of the present invention, as a highly heat-conductive material is inserted between the armature winding and the can, it is possible to effectively conduct the heat generated by the armature winding to the refrigerant flow channel of the can, thereby greatly reducing the rise in temperature of the armature winding.

According to an embodiment of the present invention, as the armature winding and the can are fixed by adhesive bonding, the same effect as in the seventh aspect can be obtained. Further, while the bolts and screws for mechanical fastening are necessary in the eighth aspect, such components are not used in the tenth aspect. Therefore, it is possible to further reduce the weight of the armature.

According to an embodiment of the present invention, as the thermal insulation material is provided in the gap between the armature winding and the casing, it is possible to reduce the rise in temperature of the casing by suppressing the heat conducted from the armature winding to the casing via air in the gap. As a result, it is possible to reduce the rise in temperature of an entire surface of the armature in addition to an entire surface of the can.

According to an embodiment of the present invention, as the refrigerant flow channel within the can is provided closer to the armature winding, the thermal resistance from the armature winding to the refrigerant flow channels can be reduced, and the thermal resistance from the refrigerant flow channels to the surface of the can can be increased. As a result, it is possible to reduce the rise in temperature of the armature winding and the surface of the can.

According to an embodiment of the present invention, as a projecting portion projecting toward the refrigerant flow channel is provided within the can, it is possible to increase rigidity of the can. It is possible to suppress an outward expansion of the can even when the pressure of the refrigerant is increased.

According to an embodiment of the present invention, as the can is configured such that a pair of metal thin plated members are integrated by diffusion bonding so that the refrigerant flow channel is formed within the can, the can according to the seventh to thirteenth aspects can be realized. A metal such as stainless steel does not have brittleness like ceramic, and the can may not be broken even if the pressure of the refrigerant increases. Further, as it is possible to reduce the number of the supporting members, the pipe resistance becomes also smaller, thus reducing the pressure of the refrigerant. It is possible to increase the flow rate of the refrigerant by an amount of the pressure reduction, thereby improving the heat recovery capability of the refrigerant, and reducing the rise in temperature at the surface of the can and the armature winding.

According to an embodiment of the present invention, as the can is configured such that a pair of carbon fiber reinforced plastic thin plated members are integrated either by adhesive bonding or by mechanical fastening so that the refrigerant flow channel is formed within the can, the same effect as in the fourteenth aspect can be obtained.

According to an embodiment of the present invention, in order to provide longer strokes for the linear motor, at least two cans are used according to a length of the armature of the linear motor extending in a direction along which a thrust force is generated, and the refrigerant flow channels within the can are connected to extend within a range of a width of the can in a direction that is perpendicular to the direction of the thrust force, thereby allowing the connection with high reliability against the leakage of the refrigerant. Therefore, the linear motor does not increase its size in cross section or its weight by the extensive connection means of the can, and thus the linear motor having a long stroke reducing the size and the weight of the armature or the canned linear motor can be realized.

According to an embodiment of the present invention, the can according to the seventeenth aspect or the eighteenth aspect having a complicated structure can be realized by integrally forming the cans by diffusion bonding stainless-steel or copper thin plated members, or by adhesively bonding or mechanical fastening carbon fiber reinforced plastic thin plated members, thereby allowing the connection with high reliability against the leakage of the refrigerant. In addition, it is possible to reduce the size and the weight of the armature or the canned linear motor.

According to an embodiment of the present invention, the can according to the nineteenth aspect having a complicated structure can be realized by integrally forming the cans and the joint by diffusion bonding stainless-steel or copper thin plated members, or by adhesively bonding or mechanical fastening carbon fiber reinforced plastic thin plated members, thereby allowing the connection with high reliability against the leakage of the refrigerant. In addition, it is possible to reduce the size and the weight of the armature or the canned linear motor.

According to an embodiment of the present invention, the canned linear motor armature according to any one of the first to twenty-first aspects and the field including the permanent magnets face each other, and one of the canned linear motor armature and the field is made as a stator and the other as a mover. Therefore, it is possible to provided the canned linear motor having the same affects as in the first to fifteenth aspects.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A canned linear motor armature comprising:
   an armature winding including a coil having a first end and a second end opposite to the first end;
   a frame having a surrounding side wall to define a first opening and a second opening opposite to the first opening, the surrounding side wall surrounding the armature winding;
   a first lid provided at the first opening of the frame to seal the first opening and comprising:
      a first refrigerant flow channel provided within the first lid itself to face the first end of the coil; and
   a second lid provided at the second opening of the frame to seal the second opening and comprising:
      a second refrigerant flow channel provided within the second lid itself to face the second end of the coil.

2. The canned linear motor armature according to claim 1, wherein the first and second refrigerant flow channels have a serpentine shape.

3. The canned linear motor armature according to claim 1, wherein each of the first lid and the second lid has a plane surface and an elongated hole extending along the plane surface at a portion except for a portion where the first and second refrigerant flow channels are provided.

4. The canned linear motor armature according to claim 1, wherein each of the first lid and the second lid comprises a first plate and a second plate, the first plate having a recess portion on a first connecting surface, the second plate having a recess portion on a second connecting surface, the first plate and the second plate being connected by diffusion bonding to contact the first connecting surface and the second connecting surface so that the recess portions form the first and second refrigerant flow channels.

5. The canned linear motor armature according to claim 1, wherein each of the first lid and the second lid comprises
   a plurality of pipes constituting the refrigerant flow channel and provided substantially in parallel along a longitudinal direction of each of the first lid and the second lid, each of the plurality of pipes having an end portion in the longitudinal direction, and
   a square member connected to the end portion of each of the plurality of pipes.

6. The canned linear motor armature according to claim 4, wherein the first plate comprises a copper plate and the second plate comprises a stainless-steel plate, each of the first lid and the second lid being integrally formed by diffusion bonding the copper plate and the stainless-steel plate, the copper plate being provided so as to face the armature winding.

7. The canned linear motor armature according to claim 1, wherein the first lid comprises a first sub lid and a second sub lid, an end of the first refrigerant flow channel provided in the first sub lid being connected to an end of the first refrigerant flow channel provided in the second sub lid, and wherein the second lid comprises a first sub lid and a second sub lid, an end of the second refrigerant flow channel provided in the first sub lid being connected to an end of the second refrigerant flow channel provided in the second sub lid.

8. The canned linear motor armature according to claim 7, wherein the first sub lid has a first stepped portion stepped in the thickness direction at an end of the first sub lid in an axial direction, and wherein the second sub lid has a second stepped portion stepped in the thickness direction at an end of the second sub lid in the axial direction, the first sub lid and the second sub lid being connected so that the first and the second stepped portions are fitted with each other.

9. The canned linear motor armature according to claim 8, wherein the first sub lid and the second sub lid are connected by adhesively bonding or mechanical fastening using carbon fiber reinforced plastic plate, or wherein the first sub lid and the second sub lid are made of at least one of steel and copper and are connected using diffusion bonding.

10. The canned linear motor armature according to claim 7, wherein the first sub lid has a recess portion at an end of the first sub lid in an axial direction, and wherein the second sub lid has a projecting portion at an end of the second sub lid in the axial direction, the first sub lid and the second sub lid being connected so that the recess portion and the projecting portion are fitted with each other.

11. The canned linear motor armature according to claim 7, wherein the first sub lid has a first connecting portion at an end of the first sub lid in an axial direction, and wherein the second sub lid has second connecting portion at an end of the second sub lid in the axial direction, the first connecting portion and the second connecting portion linearly extending or having an L-shape, a hollow joint being fitted into the first connecting portion and the second connecting portion to connect the first sub lid and the second sub lid.

12. The canned linear motor armature according to claim 11,
- wherein the first and second sub lids and the joint are connected by adhesively bonding or mechanical fastening using carbon fiber reinforced plastic plate, or
- wherein the first and second sub lids and the joint are made of at least one of steel and copper and are connected using diffusion bonding.

13. A canned linear motor armature comprising:
- an armature winding including a concentrated winding coil having a first end and a second end opposite to the first end;
- a frame having a surrounding side wall to define a first opening and a second opening opposite to the first opening, the surrounding side wall surrounding the armature winding;
- a first lid provided at the first opening of the frame to seal the first opening and connected to the frame and the armature winding, the first lid comprising:
  - a first refrigerant flow channel provided within the first lid itself to face the first end of the concentrated winding coil; and
  - a supporting member provided within the first lid itself to face an air-core of the concentrated winding coil;
- a second lid provided at the second opening of the frame to seal the second opening and connected to the frame and the armature winding, the second lid comprising:
  - a second refrigerant flow channel provided within the second lid itself to face the second end of the concentrated winding coil; and
  - a supporting member provided within the second lid itself to face the air-core of the concentrated winding coil; and
- a gap provided between the armature winding and the frame.

14. The canned linear motor armature according to claim 13, further comprising:
- a winding fixing member mechanically fixing the armature winding to the first lid and the second lid.

15. The canned linear motor armature according to claim 13, further comprising:
- a heat-conductive material provided between the armature winding and the first lid and between the armature winding and the second lid.

16. The canned linear motor armature according to claim 13, wherein the armature winding, the first lid, and the second lid are fixed by adhesive bonding.

17. The canned linear motor armature according to claim 13, further comprising:
- a thermal insulation material provided in the gap.

18. The canned linear motor armature according to claim 13, wherein each of the first and second refrigerant flow channels is provided to be offset from a center of a thickness of each of the first lid and the second lid in the thickness direction toward the armature winding.

19. The canned linear motor armature according to claim 13, further comprising:
- a projecting portion provided within the first lid to project toward the first refrigerant flow channel; and
- a projecting portion provided within the second lid to project toward the second refrigerant flow channel.

20. The canned linear motor armature according to claim 13, wherein each of the first lid and the second lid comprises a first plate and a second plate, the first plate having a recess portion on a first connecting surface, the second plate having a recess portion on a second connecting surface, the first plate and the second plate being connected by diffusion bonding to contact the first connecting surface and the second connecting surface so that the recess portions form the refrigerant flow channel.

21. The canned linear motor armature according to claim 13, wherein each of the first lid and the second lid comprises a first plate and a second plate which are made of carbon fiber reinforced plastic, the first plate having a recess portion on a first connecting surface, the second plate having a recess portion on a second connecting surface, the first plate and the second plate being connected by adhesive bonding or by mechanical fastening to contact the first connecting surface and the second connecting surface so that the recess portions form the refrigerant flow channel.

22. A canned linear motor comprising:
- a canned linear motor armature comprising:
  - an armature winding including a coil having a first end and a second end opposite to the first end;
  - a frame having a surrounding side wall to define a first opening and a second opening opposite to the first opening, the surrounding side wall surrounding the armature winding;
  - a first lid provided at the first opening of the frame to seal the first opening and comprising:
    - a first refrigerant flow channel provided within the first lid itself to face the first end of the coil; and
  - a second lid provided at the second opening of the frame to seal the second opening and comprising:
    - a second refrigerant flow channel provided within the second lid itself to face the second end of the coil; and
- a field magnet provided to face the canned linear motor armature with a magnetic gap therebetween, the field magnet having a plurality of permanent magnets whose polarities are alternately arranged, the field magnet and the canned linear motor armature being relatively movable.

* * * * *